US010331304B2

(12) United States Patent
Chandra

(10) Patent No.: US 10,331,304 B2
(45) Date of Patent: Jun. 25, 2019

(54) TECHNIQUES TO AUTOMATICALLY GENERATE BOOKMARKS FOR MEDIA FILES

(71) Applicant: Microsoft Technology Licensing, LLC, Redmond, WA (US)

(72) Inventor: Omeed Chandra, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 305 days.

(21) Appl. No.: 14/741,580

(22) Filed: Jun. 17, 2015

(65) Prior Publication Data

US 2016/0328104 A1    Nov. 10, 2016

Related U.S. Application Data

(60) Provisional application No. 62/157,577, filed on May 6, 2015.

(51) Int. Cl.
*G06F 3/0483* (2013.01)
*G10L 15/22* (2006.01)
*G10L 15/26* (2006.01)
*G06F 16/683* (2019.01)
*G06F 16/783* (2019.01)
*G06F 16/44* (2019.01)

(52) U.S. Cl.
CPC ............ *G06F 3/0483* (2013.01); *G06F 16/44* (2019.01); *G06F 16/685* (2019.01); *G06F 16/7834* (2019.01); *G10L 15/22* (2013.01); *G10L 15/26* (2013.01); *G10L 2015/221* (2013.01)

(58) Field of Classification Search
CPC ..................................................... G06F 3/0483
See application file for complete search history.

(56) References Cited

U.S. PATENT DOCUMENTS

| 6,868,225 B1 | 3/2005 | Brown et al. |
| 6,876,729 B1 | 4/2005 | Kuter et al. |
| 7,032,177 B2 | 4/2006 | Novak et al. |
| 7,823,055 B2 | 10/2010 | Sull et al. |

(Continued)

OTHER PUBLICATIONS

"International Search Report and Written Opinion Issued in PCT Application No. PCT/US2016/030488", dated Jul. 25, 2016, 9 pages.

(Continued)

*Primary Examiner* — Roland J Casillas
(74) *Attorney, Agent, or Firm* — Talem IP Law, LLP

(57) ABSTRACT

Techniques to automatically generate bookmarks for media files are described. An apparatus may comprise a logic device arranged to execute a bookmark application. The logic device may comprise, for example, a processing system having a processor and memory. The bookmark application may comprise a media file component operative to manage a media file. The media file may store various types of multimedia content. The bookmark application may further comprise a media bookmark component operative to identify a media file to store media information, scan the media file for a bookmark indicator, automatically generate a bookmark for the media file based on the bookmark indicator, and present the bookmark on a user interface. Other embodiments are described and claimed.

21 Claims, 20 Drawing Sheets

(56) References Cited

U.S. PATENT DOCUMENTS

| | | | |
|---|---|---|---|
| 8,233,597 | B2 | 7/2012 | Kerr et al. |
| 8,423,363 | B2 | 4/2013 | Gupta et al. |
| 8,611,507 | B2 | 12/2013 | Mikan et al. |
| 8,731,935 | B2 | 5/2014 | Chavez et al. |
| 8,953,928 | B2 | 2/2015 | Beacham et al. |
| 2003/0093790 | A1 | 5/2003 | Logan et al. |
| 2004/0203621 | A1 | 10/2004 | Brown et al. |
| 2004/0223737 | A1* | 11/2004 | Johnson ............... G11B 27/034 386/241 |
| 2008/0052739 | A1 | 2/2008 | Logan |
| 2008/0155627 | A1 | 6/2008 | O'connor et al. |
| 2009/0251440 | A1 | 10/2009 | Edgecomb et al. |
| 2009/0306981 | A1 | 12/2009 | Cromack et al. |
| 2010/0088726 | A1 | 4/2010 | Curtis et al. |
| 2011/0258216 | A1 | 10/2011 | Supakkul et al. |
| 2012/0245936 | A1* | 9/2012 | Treglia .............. G06F 17/30746 704/235 |
| 2012/0290310 | A1 | 11/2012 | Watson |
| 2012/0310642 | A1 | 12/2012 | Cao et al. |
| 2013/0066630 | A1 | 3/2013 | Roe |
| 2013/0145265 | A1 | 6/2013 | Cunningham |
| 2013/0266127 | A1 | 10/2013 | Schachter et al. |
| 2014/0025379 | A1 | 1/2014 | Ganapathiraju et al. |
| 2014/0215376 | A1 | 7/2014 | Lection et al. |
| 2016/0328105 | A1 | 11/2016 | Chandra et al. |

OTHER PUBLICATIONS

"Audiolio—Audio Recorder, Text Notes, and Bookmarks with Dropbox", Published on: Sep. 12, 2014 Available at: https://itunes.apple.com/us/app/audiolio-audio-recorder-text/id403056408?mt=8.

"Victor Reader Stream 3.0 User Guide", by HumanWare, Retrieved from: https://web.archive.org/web/20150506065045/http://www.aisquared.com/docs/productspotlight/StreamUserGuide.pdf, Retrieved on: May 6, 2015, 39 Pages.

"Final Office Action Issued in U.S. Appl. No. 14/741,619", dated Oct. 24, 2017, 16 Pages.

"Non Final Office Action Issued in U.S. Appl. No. 14/741,619", dated Mar. 5, 2018, 17 Pages.

"Non-Final Office Action Issued in U.S. Appl. No. 14/741,619", dated Jun. 1, 2017, 15 Pages.

"International Preliminary Report on Patentability Issued in PCT Application No. PCT/US2016/030487", dated Jan. 30, 2017, 6 Pages.

"International Search Report and Written Opinion Issued in PCT Application No. PCT/US2016/030487", dated Jul. 21, 2016, 10 Pages.

"Second Written Opinion Issued in PCT Application No. PCT/US2016/030487", dated Oct. 24, 2016, 5 Pages.

Suzanne, "Using OneNote during Meetings", Retrieved From https://blogs.technet.microsoft.com/hub/2009/12/01/using-onenote-during-meetings/, Dec. 1, 2009, 3 Pages.

* cited by examiner

*User Interface View 550*

Notebook

Computer Science
Monday, May 4, 2015

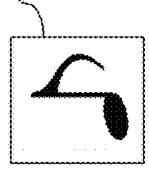
Lecture1 125-1

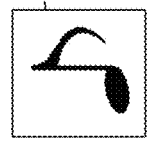
Lecture2 125-2

Presentation Surface 122

Notes 502

126-1 — Audio recording started 1:53 PM Monday, May 4, 2015    Audio recording started 4:00 PM Monday, May 4, 2015

Information may be stored in a data structure. Basic data structures include stacks, linked lists and binary trees.
*Bookmark1 placed for Lecture1 at 0:28* 504-1

A stack is an abstract data type that serves as a collection of elements....
*Bookmark1 placed for Lecture2 at 0:15* 504-3

126-3 — A linked list is a data structure comprising a group of nodes which together represent a sequence....

```
IDENTIFY A MEDIA FILE TO STORE MEDIA INFORMATION
802

RECEIVE A CONTROL DIRECTIVE TO AUTOMATICALLY
GENERATE A BOOKMARK FOR THE MEDIA FILE
804

SCAN THE MEDIA FILE FOR A BOOKMARK INDICATOR
806

GENERATE THE BOOKMARK FOR THE MEDIA FILE BASED
ON THE BOOKMARK INDICATOR
808

GENERATE A TEXT SEGMENT FOR THE BOOKMARK
810

PRESENT THE BOOKMARK AND/OR THE TEXT SEGMENT ON
A USER INTERFACE
812
```

SCAN THE MEDIA FILE FOR A
BOOKMARK INDICATOR
*806*

CONVERT AUDIO INFORMATION FROM THE MEDIA
FILE TO TEXT INFORMATION
*824*

DETECT ONE OR MORE KEYWORDS FROM THE TEXT
INFORMATION AS THE BOOKMARK INDICATOR
*826*

SCAN THE MEDIA FILE FOR A BOOKMARK INDICATOR
806

PERFORM VOICE RECOGNITION TO DETERMINE IDENTITY INFORMATION FOR A SOURCE OF THE AUDIO INFORMATION
842

DETECT AN IDENTITY FROM THE IDENTITY INFORMATION AS THE BOOKMARK INDICATOR
844

```
GENERATE A BOOKMARK FOR THE MEDIA FILE BASED ON
THE BOOKMARK INDICATOR
808
```

```
RETRIEVE A TEXT SEGMENT CORRESPONDING TO A
DEFINED PORTION OF AUDIO INFORMATION OF THE
MEDIA FILE BASED ON THE BOOKMARK
862
```

```
PRESENT THE BOOKMARK AND THE TEXT SEGMENT ON A
PRESENTATION SURFACE OF AN APPLICATION PROGRAM
864
```

```
RETRIEVE A FIRST TIMESTAMP REPRESENTING A TIME
INDEX FOR THE MEDIA FILE
902
```

```
RETRIEVE A SECOND TIMESTAMP REPRESENTING A TIME
INDEX FOR THE MEDIA FILE
904
```

```
RETRIEVE A FILE IDENTIFIER FOR THE MEDIA FILE
906
```

```
GENERATE A BOOKMARK FOR THE MEDIA FILE WITH THE
FIRST TIMESTAMP, THE SECOND TIMESTAMP AND/OR THE
FILE IDENTIFIER
908
```

*FIG. 9*

TECHNIQUES TO AUTOMATICALLY GENERATE BOOKMARKS FOR MEDIA FILES

RELATED CASES

This application claims priority to U.S. Provisional Patent Application No. 62/157,577 titled "Techniques To Manage Bookmarks For Media Files" filed on May 6, 2015, the entirety of which is hereby incorporated by reference. This application is related to U.S. patent application No. Ser. 14/741,619 titled "Techniques To Automatically Generate Bookmarks For Media Files" filed on Jun. 17, 2015, the entirety of which is hereby incorporated by reference.

BACKGROUND

Content recordings, such as audio or video recordings, are used to memorialize information to be reviewed later. In some cases, however, it may be difficult to locate relevant information, particularly in a longer content recording of meetings, classes, interviews, and other similar scenarios. Typically only certain parts of a content recording are of particular interest to a user. If a user were able to quickly locate certain portions of a content recording, it would lead to improved use of the content recording.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to electronic media systems. Some embodiments are particularly directed to an electronic media system arranged to automatically generate electronic bookmarks for one or more media files. The electronic media system may automatically generate one or more bookmarks for a media file without user intervention (e.g., without requiring manual bookmark generation). The bookmarks allow the user to quickly locate and reproduce media content of interest for later review. The electronic media system may store the bookmarks with the media file as metadata for later use by various users.

In one embodiment, for example, an apparatus may comprise a logic device arranged to execute a bookmark application. The logic device may comprise, for example, a processing system having a processor and memory. The bookmark application may comprise a media file component operative to manage a media file. The media file may store various types of multimedia content. The bookmark application may further comprise a media bookmark component operative to identify a media file to store media information, scan the media file for a bookmark indicator, automatically generate a bookmark for the media file based on the bookmark indicator, and present the bookmark on a user interface. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 5B illustrates an embodiment of a second user interface view of bookmarks.
FIG. 8A illustrates an embodiment of a first logic flow for generating a bookmark for a media file.
FIG. 8B illustrates an embodiment of a second logic flow for scanning a media file for a bookmark indicator.
FIG. 8C illustrates an embodiment of a third logic flow for scanning a media file for a bookmark indicator.
FIG. 8D illustrates an embodiment of a fourth logic flow for generating a bookmark for a media file.
FIG. 9 illustrates an embodiment of a fifth logic flow for generating a bookmark for a media file.

DETAILED DESCRIPTION

Figure 1A:
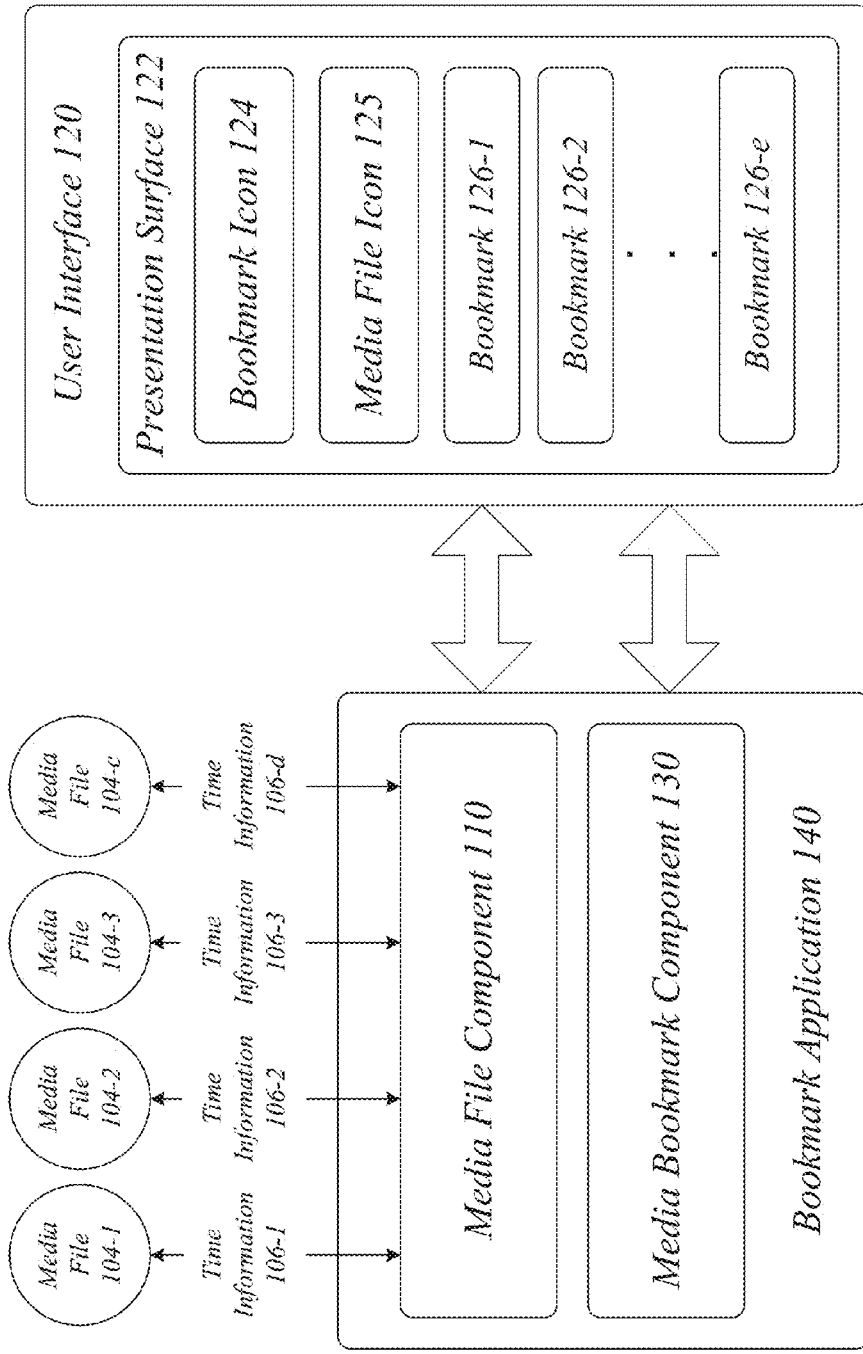
FIG. 1A illustrates an embodiment of a media system.

A user may often need to record media content via an electronic device. For instance, a user may use a mobile device such as a smartwatch, smartphone, tablet computer or laptop computer to record audio or video information from lectures, meetings, interviews, and so forth. The electronic device may store the recorded media content as a media file in some form of computer-readable memory. A user (same or different) may desire to review the recorded media content at a later time. However, it may be difficult to locate relevant information within the recorded media content, particularly if it is lengthy or contains complex information. Embodiments are designed to allow a user to quickly and easily locate certain portions of a content recording. This leads to more efficient and effective use of the content recording, thereby providing a better user experience. In addition, the embodiments save battery power, memory resources and/or compute cycles for an electronic device, such as a mobile device, thereby resulting in significant technical advantage and technical effect.

Various embodiments are generally directed to electronic media systems arranged to automatically generate electronic bookmarks for a media file. The electronic media system may allow a user to initiate automatic bookmark generation operations to automatically generate electronic bookmarks for various media files generated by different media sources, such as audio sources, video sources, audio/video sources, and so forth. For instance, electronic bookmarks for a media file may be automatically generated through use of a software application designed to scan the media file for different types of bookmark indicators, such as a set of selected keywords that may indicate media content that is particularly important or relevant to the user. The keyword scanning may allow automatic generation of electronic bookmarks for presentation in, for example, a note application for a user, so the user can easily see and activate selected portions of a media file in order to listen to bookmarked content in the media file. In addition, the electronic bookmarks may be used to automatically transcribe select portions of the media file using speech-to-text (STT) technology, with particular focus on time slices of the media file in which keywords were detected.

In one embodiment, for example, a user interface element such as bookmark icon may be presented as part of a user interface for a media application used to record and playback media content. Before, during and/or after recording of media content to a media file or playback of media content from the media file, a user may manually select the bookmark icon to initiate bookmark generation operations. A bookmark application may scan the media file for various bookmark indicators (e.g., keywords, speaker identity, speaker location), and automatically generate multiple electronic bookmarks for the media file based on the bookmark indicators. An electronic bookmark may have, among other information, a start time for when a portion of the media file begins, an end time for when the portion of the media file ends, a user message, metadata for the media file (e.g., a file name, a file identifier), and/or other types of information. The electronic bookmarks may be presented in a user interface with various user interface elements, such as text based bookmark annotations or representations in a document for an application program, selectable icons or links, visual indicators on a media file waveform, and so forth. In addition to presenting electronic bookmarks, select portions of the media file associated with a given bookmark may be converted to text and presented along with the appropriate bookmark (e.g., to assist in note taking operations). A user may then select an electronic bookmark to begin playback of media content from the media file at a start time associated with the electronic bookmark. This allows a user to quickly and efficiently mark and locate media content of particular interest to the user. As a result, the embodiments can improve affordability, scalability, modularity, extendibility, or interoperability for an operator, device or network.

In one use scenario, for example, when recording or playing audio in an application program such as MICROSOFT® ONENOTE®, a user can press a button to initiate bookmark generation operations to bookmark any desired moments in the audio recording for later reference. The bookmark may be represented as text in a notes section, and also in the form of visual markers on an audio seek bar. For example, when using MICROSOFT ONENOTE on a mobile device (e.g., a smartphone), an audio bookmark button may be presented at the top-left corner of the user interface when operating in recording or playback modes. Pressing this button causes automatic generation of one or more bookmarks for a media file, and then places a colored marker (e.g., blue) on the audio recording timeline and/or adds a bookmark text in a user's notes section below the audio recording timeline. During audio playback, the user interface may display small blue markers on the audio seek bar to represent bookmarks that were placed for the recording. If the user taps on a bookmark in their notes, a "Play from this time" button appears which allows the user to jump directly to the point in the audio recording when the bookmark was placed.

Previous solutions are deficient in many respects. For example, longer media recordings of meetings, classes, interviews, and other similar scenarios may be difficult to utilize efficiently. Typically, only certain parts of these recordings are of particular interest to a given listener, and there is no easy and elegant way to identify the most interesting parts of the recording for later reference. In order to retrieve important data stored in an audio recording, for example, a user will typically listen to the entire audio recording, jump around the recording repeatedly in an attempt to locate key information, or manually write down the timestamps at which key information is stored. All of these solutions are time-consuming and/or labor-intensive. Audio transcription technology may also be used, but in its current state, such technology is often inaccurate.

Electronic bookmarks provide several advantages over previous solutions. For example, the use of electronic bookmarks enhances user experience by allowing a bookmark application to quickly and efficiently mark key moments in a media recording so the user can jump directly to the relevant parts of the media recording during a later review. This allows audio recordings of various live events (e.g., meetings, classes, interviews) to be more useful because a user does not need to listen to the entire audio recording from beginning to end in order to find the most important parts. Rather, the user will know exactly which parts were marked for review and can jump directly to them using a button that appears when the bookmark is activated. In addition to enhancing user experience, electronic bookmarks may allow a user to more quickly find relevant information, which may result in reduced power consumption and extended battery life for various mobile devices, such as smartphones, smartwatches, tablet computers and portable computers.

With general reference to notations and nomenclature used herein, the detailed descriptions that follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method operations. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1A illustrates a block diagram of a media system 100 having a bookmark application 140. In one embodiment, for example, the media system 100 and the bookmark application 140 may comprise various components, such as components 110, 130, for example. As used herein the terms "system" and "application" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1A, the media system 100 and the bookmark application 140 may be implemented by an electronic device. Examples of an electronic device may include without limitation an ultra-mobile device, a mobile device, a personal digital assistant (PDA), a mobile computing device, a smartphone, a telephone, a digital telephone, a cellular telephone, an ebook reader, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wearable electronics such as a smartwatch, wireless access point, base station, subscriber station, mobile subscriber center, radio network controller, router, hub, gateway, bridge, switch, machine, or combination thereof. Although the bookmark application 140 as shown in FIG. 1A has a limited number of elements in a certain topology, it may be appreciated that the bookmark application 140 may include more or less elements in alternate topologies as desired for a given implementation.

The components 110, 130 may be communicatively coupled via various types of communications media. The components 110, 130 may coordinate operations between each other. The coordination may involve the uni-directional or bi-directional exchange of information. For instance, the components 110, 130 may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In the illustrated embodiment shown in FIG. 1A, the media system may include one or more media files 104-$c$ and the bookmark application 140. It is worthy to note that "a" and "b" and "c" and similar designators as used herein are intended to be variables representing any positive integer. Thus, for example, if an implementation sets a value for c=5, then a complete set of media files 104-$c$ may include media files 104-1, 104-2, 104-3, 104-4 and 104-5. The embodiments are not limited in this context.

The media files 104-$c$ may comprise media content recorded by an analog or digital media sensor, such as a digital video recorder, a digital audio recorder, a digital audio/video (A/V) recorder, an application program, a system program, a web application, a web service, and so forth. The bookmark application 140 may use one or more selected media files 104-$c$ to generate one or more electronic bookmarks 126-$e$ and/or text segments 128-$h$ presented by a user interface 120. In one embodiment, a user may cause the bookmark application 140 to automatically generate when the one or more electronic bookmarks 126-$e$ are generated for the media files 104-$c$. In an alternate embodiment, a user may manually select when the one or more electronic bookmarks 126-$e$ are generated for the media files 104-$c$.

The bookmark application 140 may be a stand-alone application program, or integrated with other software programs. In one embodiment, for example, the bookmark application 140 may be integrated with an operating system, such as MICROSOFT® WINDOWS®, made by Microsoft Corporation, Redmond, Wash. In one embodiment, for example, the bookmark application 140 may be integrated with a productivity suite of inter-related client applications, server applications and web services, designed for a particular operating system, such as a MICROSOFT® OFFICE productivity suite for MICROSOFT WINDOWS®, made by Microsoft Corporation, Redmond, Wash. Examples for client applications may include without limitation MICROSOFT WORD, MICROSOFT EXCEL®, MICROSOFT POWERPOINT®, MICROSOFT OUTLOOK®, MICROSOFT ACCESS®, MICROSOFT INFOPATH®, MICROSOFT ONENOTE®, MICROSOFT PROJECT, MICROSOFT PUBLISHER, MICROSOFT SHAREPOINT® WORKSPACE, MICROSOFT VISIO®, MICROSOFT OFFICE INTERCONNECT, MICROSOFT OFFICE PICTURE MANAGER, MICROSOFT SHAREPOINT DESIGNER, MICROSOFT LYNC, and MICROSOFT SKYPE® FOR BUSINESS. Examples for server applications may include without limitation MICROSOFT SHAREPOINT SERVER, MICROSOFT LYNC SERVER, MICROSOFT SKYPE FOR BUSINESS SERVER, MICROSOFT OFFICE FORMS SERVER, MICROSOFT OFFICE GROOVE® SERVER, MICROSOFT OFFICE PROJECT SERVER, MICROSOFT OFFICE PROJECT PORTFOLIO SERVER, and MICROSOFT OFFICE PERFORMANCEPOINT® SERVER. Examples for web services may include without limitation MICROSOFT WINDOWS LIVE®, MICROSOFT OFFICE WEB APPLICATIONS, MICROSOFT OFFICE LIVE, MICROSOFT LIVE MEETING, MICROSOFT OFFICE PRODUCT WEB SITE, MICROSOFT UPDATE SERVER, and MICROSOFT OFFICE 365. The embodiments are not limited to these examples.

The bookmark application 140 may comprise, among other elements, a media file component 110 and a media bookmark component 130. The media file component 110 may be generally used to manage a media file 104, such as recording a media file 104, playing back a media file 104, modifying a media file 104, storing a media file 104, identifying a media file 104, and so forth. The media bookmark component 130 may be generally used to manage an electronic bookmark 126 for a media file 104, such as generating and/or detecting bookmark indicators for an electronic bookmark 126, generating an electronic bookmark 126, generating a text segment 128 associated with an electronic bookmark 126, presenting an electronic bookmark 126 and/or associated text segment 128, activating an electronic bookmark 126, modifying an electronic bookmark 126, and so forth. An electronic bookmark 126 may include various types of information to identify a specific location within a media file 104. The information may include temporal information, such as time information 106-d associated with each of the media files 104-c, spatial information (e.g., visual markers on an audio waveform), or other types of marking information. In one embodiment, for example, the media bookmark component 130 may use the time information 106 to generate a bookmark 126 to include a first timestamp representing a start time for a media file segment of a media file 104, a second timestamp representing an end time for the media file segment of the media file 104, and/or an identifier for the media file 104. Embodiments are not limited to this example.

In one embodiment, for example, the media file component 110 may be arranged to provide a presentation surface 122 for a user interface 120. The presentation surface 122 may include, among other elements, a bookmark icon 124, one or more media file icons 125-a representing corresponding media files 104-c, and various bookmarks 126-1, 126-2 . . . 126-e for the media files 104-c.

The bookmark application 140 may be generally operative to create media bookmarks (e.g., audio bookmarks, video bookmarks), and initiate playback based on those bookmarks. This may be particularly useful for audio recordings or playback performed concurrently with notetaking scenarios. In one embodiment, when a user presses a specific user interface element, such as an "Audio Bookmark" button, the bookmark application 140 may initiate automatic bookmark generation operations to generate multiple electronic bookmarks 126 for a media file 104, and insert the bookmarks 126 (e.g., as bookmark annotations) for each electronic bookmark 126 in a note section indicating a timestamp and associated media file 104. In another embodiment, when a user presses a specific user interface element, such as an "Audio Bookmark" button, the bookmark application 140 may generate a single electronic bookmark 126 for a media file 104, and insert a bookmark annotation in a note section indicating a timestamp and associated media file 104. In addition, display markers may be positioned on an audio seek bar to represent bookmarks in a visual fashion. By selecting an audio bookmark, the user can initiate playback of the audio recording from a point when the bookmark was placed, making it easy to refer back to key moments in the audio recording. In this manner, the user does not need to type a lot of notes on his own, manually write down timestamps, listen to the entire recording, or jump around the recording in search of key moments.

Figure 2:
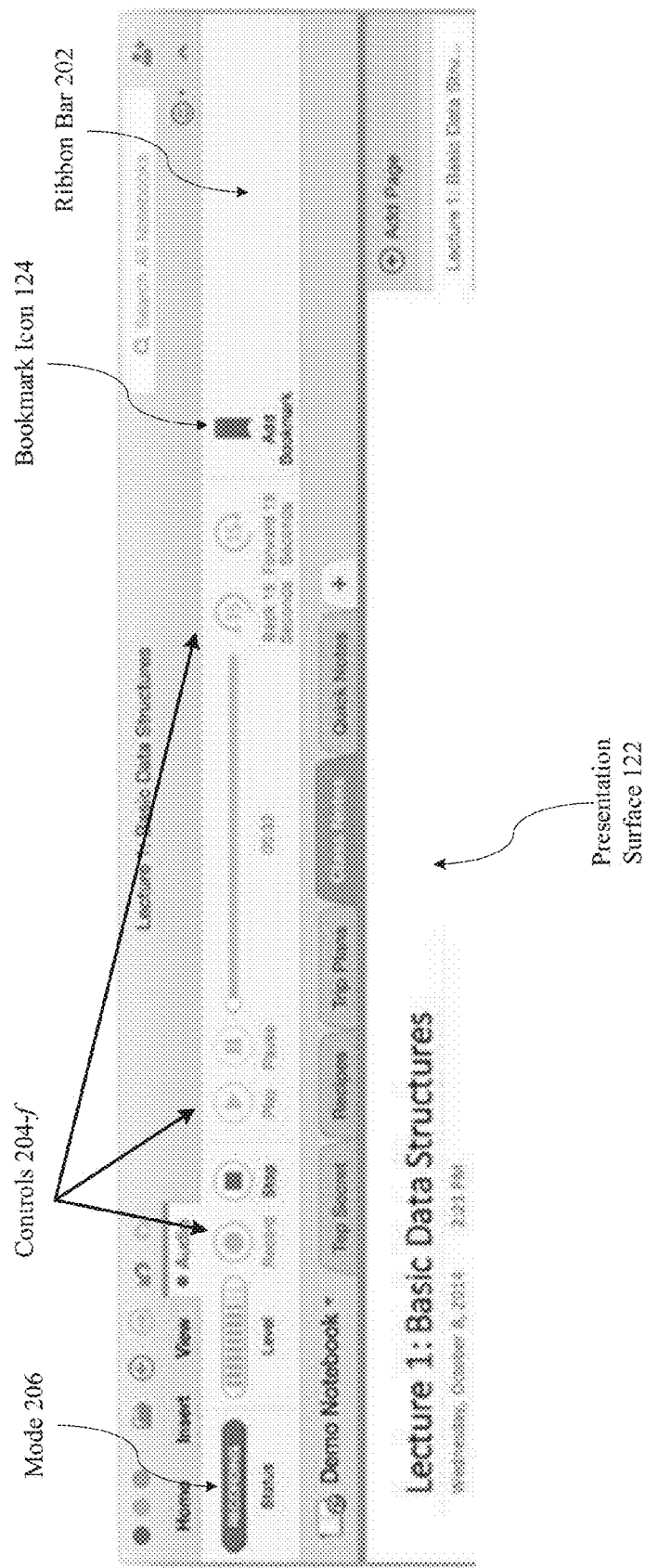
FIG. 2 illustrates an embodiment of a user interface view to record.
Figure 3:
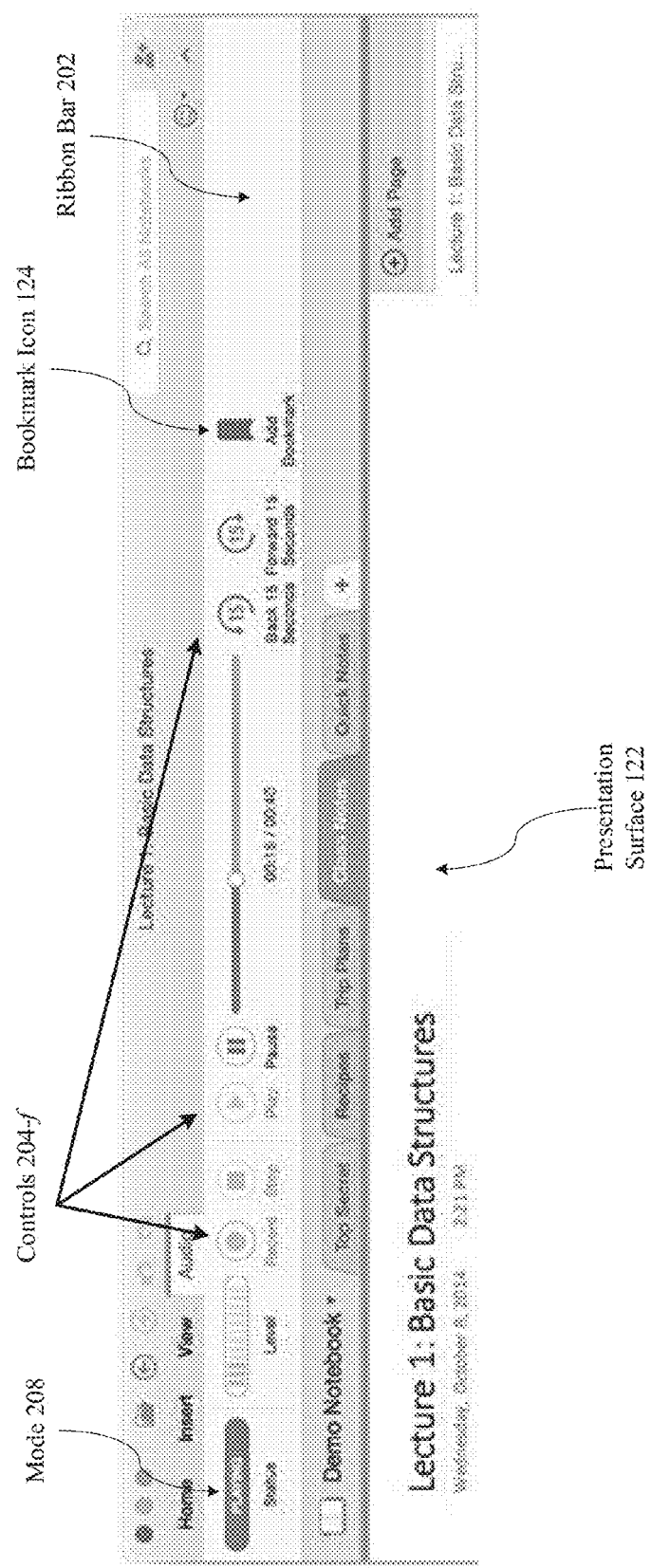
FIG. 3 illustrates an embodiment of a user interface view to playback.
Figure 4:
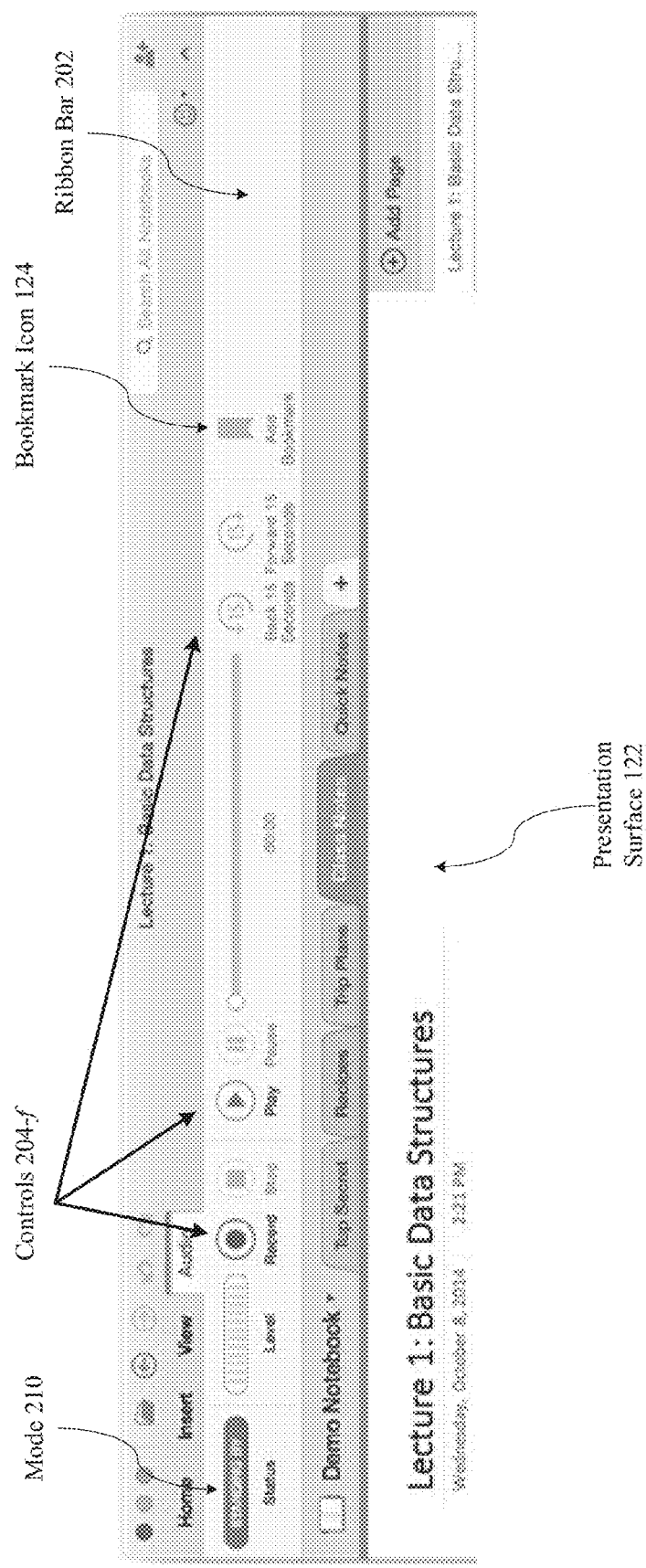
FIG. 4 illustrates an embodiment of a user interface view to standby.

As shown in FIG. 1A, the bookmark application 140 may comprise a media file component 110 to manage a media file 104. The bookmark application 140 may further comprise a media bookmark component 130 operatively coupled to the media file component 110, the media bookmark component 130 to present a bookmark icon 124 for the media file 104 on a user interface 120. The media bookmark component 130 may detect activation of the bookmark icon 124 (e.g., an input device such as a pointer, touch-screen or voice command), and generate multiple electronic bookmarks 126 for the media file 104 in response to activation of the bookmark icon 124 based on time information 106 for the media file 104. The media bookmark component 130 may detect activation of the bookmark icon 124 before, after or during recording operations or playback operations of media content for the media file 104. Sample user interface views demonstrating this feature are illustrated in FIGS. 2-4.

The bookmark icon 124 is one way for a user to initiate creation of a single or multiple electronic bookmarks 126. However, other user interface elements may also be used to initiate creation of a bookmark 126 as well. For instance, other graphical or visual representations may be used in lieu of the bookmark icon 124, including images, animations, radio buttons, and the like. In addition, traditional menu items and keyboard shortcuts may be used to create a bookmark 126 as well. Furthermore, bookmarks 126 may be created based on haptic contact engagement with a touch-screen interface of the touch-screen display, such as certain swipe patterns (e.g., left-to-right), tapping patterns (e.g., double taps), and so forth. A particular trigger for creating a bookmark 126 may vary by implementation, and embodiments are not limited in this context.

Figure 1B:
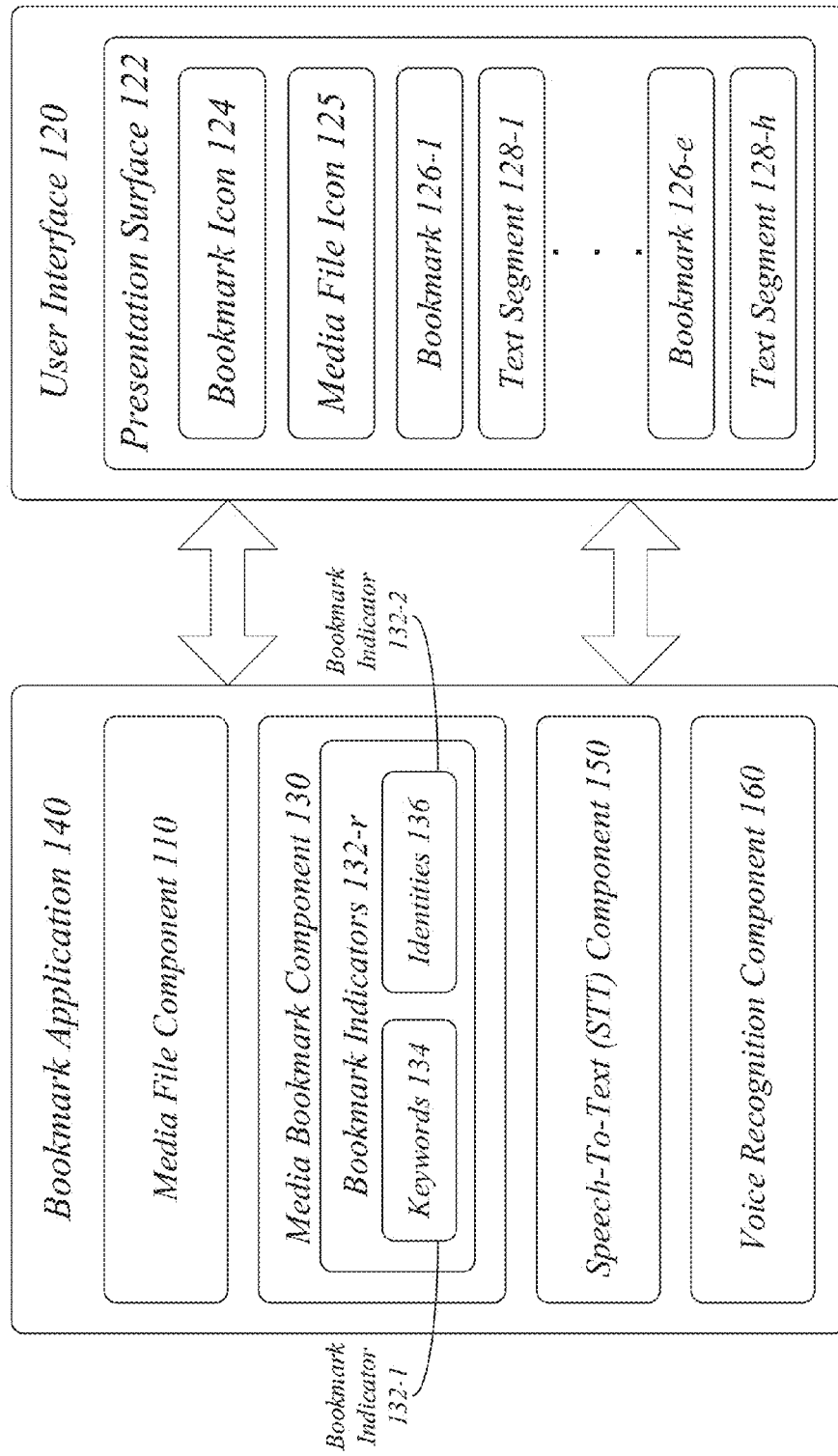
FIG. 1B illustrates a different embodiment of a media system.

FIG. 1B illustrates a block diagram of the media system 100 having the bookmark application 140 with additional components used to automatically generate multiple electronic bookmarks 126 for a media file 104 in response to a single activation of the bookmark icon 124.

FIG. 1B illustrates logic, at least a portion of which is implemented in hardware, with the logic arranged to control a bookmark application 140 to manage bookmarks 126 for a media file 104 to store media content. In one embodiment, the bookmark application 140 may comprise a media file component 110 operatively coupled to a media bookmark component 130. The media file component 110 may manage a media file 104. The media bookmark component 130 may identify a media file 104 to store media information, scan the media file 104 for a bookmark indicator 132, automatically generate a bookmark 126 for the media file 104 based on the bookmark indicator 132, and present the bookmark 126 on a user interface 120.

As previously described, the bookmark icon 124 may be arranged to initiate different sets of bookmark operations depending on a particular operating mode for the bookmark application 140. The bookmark application 140 may be configured for a manual mode, an automatic mode, or in some cases both a manual mode and automatic mode. In a manual mode, a user may selectively activate the bookmark icon 124 during recording or playback of a media file 104 in order to generate a single bookmark 126 corresponding to each time the user activates the bookmark icon 124. This may be desirable, for example, when a user wants to manually create each bookmark 126 for the media file 104. In automatic mode, a user may activate the bookmark icon 124 a single time in order to initiate automatic bookmark generation operations to generate a plurality of bookmarks 126 for the entire media file 104. The user may activate the bookmark icon 124 before, after, or during recording or playing the media file 104. The bookmark application 140 may scan the media file 104 for bookmark indicators 132-r, and automatically generate one or more bookmarks 126 based on the bookmark indicators 132-r. When the bookmark application 140 is set to operate in both manual mode and automatic mode, the bookmark application 140 may generate multiple bookmarks 126 for a media file 104 in response to a single user control directive, and the bookmark application 140 may generate a single bookmark 126 for the same (or different) media file 104 in response to each user control directive. As such, operations associated with the bookmark icon 124 may vary depending on whether the bookmark application 140 is set to a manual mode or automatic mode.

When in automatic mode, the bookmark application 140 may use additional components to scan a media file 104, and automatically generate one or more bookmarks 126 for the media file 104 based on scan results. In one embodiment, the bookmark application 140 may scan a media file 104 for one or more bookmark indicators 132-r.

A bookmark indicator 132 may comprise any information suitable for indicating when the bookmark application 140 should generate a bookmark 126. The information may be contained within media content stored by a media file 104, such as portions of audio information, portions of audio information converted into text information, portions of video information, portions of combined audio/video information, object information, and so forth. The information may also include metadata associated with a media file 104, such as time information, date information, identity information for speakers, location information, room information, calendar information, application information, system information, device information, network information, wireless information, component information, peripheral information, connected devices, conference call information, bridge information, equipment information for equipment within a room where the media content was recorded, and so forth. In one embodiment, the bookmark indicator 132-1 may comprise or be implemented as one or more keywords 134. In one embodiment, the bookmark indicator 132-2 may comprise or be implemented as one or more identities 136. These are merely two examples of bookmark indicators 132, and other bookmark indicators 132 (and associated components) may be used for a given implementation. Embodiments are not limited in this context.

As shown in FIG. 1B, for example, the bookmark application 140 may further comprise a speech-to-text (STT) component 150 and a voice recognition component 160. The bookmark application 140 may use the STT component 150 and the voice recognition component 160 to detect bookmark indicators 132-1, 132-2, respectively. Other components may be implemented to detect other types of bookmark indicators 132. Embodiments are not limited in this context.

The STT component 150 may be used to detect a bookmark indicator 132-1 in the form of keywords 134. The STT component 150 may be operatively coupled to the media file component 110 and/or the media bookmark component 130. The STT component 150 may be arranged to receive audio information from a media file 104, convert the audio information to text information, and output the text information for use by the media bookmark component 130.

The STT component 150 may implement any standard STT technique in order to convert human speech from audio form to text form. The STT component 150 may receive audio information from a media file 104, detect human speech in the audio information in the form of words or sentences, and convert the human speech from audio to text. The STT component 150 may perform STT conversion operations on a periodic, on demand or continuous basis. Different STT components 150 may be implemented to account for various types of human speech, including different languages, dialects, accents, vocabularies, geographies, and so forth. The converted text may be stored in a data structure, either temporary or persistent, for access by the media bookmark component 130. In addition to converted text, various types of metadata may be stored with the converted text, such as temporal information to mark when in the media file 104 the audio information corresponding to the converted text was spoken, a media file identifier, and so forth. Additionally or alternatively, the converted text may be streamed to the media bookmark component 130 to allow automatic bookmark generation operations in real-time or near real-time.

The media bookmark component 130 may access the converted text either from the data structure used to store the converted text or streamed in real-time from the STT component 150. The media bookmark component 130 may then attempt to detect one or more keywords 134 from the text information as the bookmark indicator 132-1. For instance, the media bookmark component 130 may compare the text information to a list of keywords 134 to detect a match. When there is a match, the media bookmark component 130 may generate a bookmark 126 with the associated metadata, such as a media file identifier and/or temporal information.

A keyword 134 may comprise any particular word or phrase indicative of an important or relevant moment within a media file 104. Examples of keywords 134 may include without limitation a first name, a last name, a topic, a statement, a question, a time, a date, a subject matter term, or any other keyword suitable for a given media file 104. Different sets of keywords 134 may be used for different types of media files 104.

In one embodiment, keywords 134 may be selected by subject matter or a particular topic. For instance, if a media file 104 is a recording of a lecture for a class in a particular subject or topic within a subject, then a set of keywords 134 appropriate for that subject or topic may be used for that particular media file 104. If the subject or topic was calculus, for example, then a set of keywords 134 may include terms such as "equation" or "derivative" or "differential." If the subject or topic was biology, for example, then a set of keywords 134 may include terms such as "genus" or "species" or "genetics." If a media file 104 is a recording of a business meeting, then a set of keywords 134 appropriate for a business environment may be used for that particular media file 104, such as "profit" or "expense" or "accrual."

In one embodiment, keywords 134 may be selected by types of syntax or vocabulary. For instance, words that imply importance such as "important" or "strategic" or "urgent" may be used as bookmark indicators 132-1. Phrases such as "this will appear on the test" or "this is a high-priority project" may also be used as well.

In one embodiment, the media bookmark component 130 may search for explicit matches between converted text and keywords 134. In another embodiment, the media bookmark component 130 may search for implicit matches between converted text and keywords 134. For instance, the media bookmark component 130 may implement fuzzy logic, similar to search engine keyword logic, to examine groupings of words in order to infer meaning. The media bookmark component 130 may then generate bookmarks 126 based on the inferred meaning.

In addition to using bookmark indicator 132-1, the media bookmark component 130 may also be used to create one or more text segments 128 around or near a bookmark 126 for insertion into the presentation surface 122 along with the bookmark 126. For instance, assume the STT component 150 stores previously converted text for a media file 104 in a data structure during transcription operations for keyword detection. Once a keyword 134 is detected, the media bookmark component 130 may generate a bookmark 126. In addition, the media bookmark component 130 may retrieve a text segment 128 corresponding to a defined portion of audio information of the media file based on a bookmark 126. For instance, the media bookmark component 130 may receive an audio length parameter representing a defined length of audio that occurs before, after or during a time associated with the bookmark 126. The media bookmark component 130 may retrieve converted text from the data structure corresponding to the audio length parameter utilizing the temporal information stored with the converted text. The media bookmark component 130 may then present the bookmark 126 and associated text segment 128 on the presentation surface 122 of an application program.

In cases where the STT component 150 has not previously converted text for a media file 104, or has not persistently stored previously converted text for a media file 104 in a data structure (e.g., in streaming mode), the media bookmark component 130 may send a bookmark identifier and an audio length parameter associated with the bookmark identifier to the STT component 150. The STT component 150 may convert a defined portion of audio information from the media file 104 to a defined set of text information (e.g., text segment 128) based on the bookmark identifier and the defined length indicated by the audio length parameter, and output the defined set of text information for use by the media bookmark component 130. The media bookmark component 130 may then present the bookmark 126 and the defined set of text information on a presentation surface 122 of an application program.

The voice recognition component 160 may be used to detect a bookmark indicator 132-2 in the form of one or more identities 136. The voice recognition component 160 may be operatively coupled to the media file component 110 and/or the media bookmark component 130. The voice recognition component 160 may be arranged to receive audio information from the media file 104, perform voice recognition to determine identity information for a source of the audio information, and output the identity information for use by the media bookmark component 130.

In some cases, it may be useful to generate bookmarks 126 based on a particular individual who is speaking. For instance, assume a media file 104 is a recording of a business meeting with multiple individuals working on a business project. It may be desirable to generate bookmarks 126 whenever a project leader is speaking. The voice recognition component 160 may analyze a media file 104 to detect an identity for each speaker in the meeting. For instance, the voice recognition component 160 may compare samples of speech from a speaker with a library of speech clips, each speech clip containing audio information for a particular individual. Alternatively, the voice recognition component 160 may use contextual information, such as particular keywords 134 or groups of keywords 134, to infer identities of various speakers in the audio recording. The voice recognition component 160 may store identities for all speakers detected in a media file 104, and output identity information for each speaker and temporal information as to when each identity is speaking to a data structure. Alternatively, the voice recognition component 160 may stream such information directly to the media bookmark component 130 for real-time or near real-time operations.

The media bookmark component 130 may detect an identity from the identity information as the bookmark indicator 132-2. The media bookmark component 130 may compare identity information with a set of identities 136. When there is a match, the media bookmark component 130 may automatically generate a bookmark 126. In addition, the media bookmark component 130 may automatically generate a text segment 128 for the bookmark 126. The media bookmark component 130 may present the bookmark 126 and the text segment 128 on a presentation surface 122 of an application program.

It may be appreciated that the bookmark indicators 132-1, 132-2 are presented by way of example and not limitation. Other bookmark indicators 132 may be implemented as well. For instance, other bookmark indicators 132 may be based on speaker accent, speaker language, speaker gender, vocabulary, syntax, semantics, equipment, conference room, bridge information, device information, and so forth. Embodiments are not limited in this context.

FIG. 2 illustrates a user interface view 200. User interface view 200 illustrates a user interface view for an exemplary application program, such as MICROSOFT ONENOTE. MICROSOFT ONENOTE provides a set of features that allow a user to record and play audio while taking notes, such as during a lecture, interview or meeting. Although MICROSOFT ONENOTE may be used to describe various embodiments, it may be appreciated that other software products may be used to implement the same or similar concepts.

As shown in FIG. 2, the user interface view 200 comprises a contextual ribbon bar 202 having a set of user interface controls 204-f for the media file component 110 of the bookmark application 140 as integrated with another application program, which in this case is MICROSOFT ONENOTE. The user interface controls 204 may include various controls to manage a media file, such as icons to record media content such as audio to a media file, stop recording media content to a media file, play media content from a media file, pause recording media content to a media file, rewind media content a certain time period (e.g., 15 seconds) for a media file, and forward media content a certain time period (e.g., 15 seconds) for a media file. The contextual ribbon bar 202 may include other user interface elements relevant to recording audio, such as a status indicator, level indicator and slider artwork. The particular user interface elements of the contextual ribbon bar 202 and the user interface controls 204 may vary according to various states of the application program, such as whether audio is currently playing, paused, recording; whether an audio clip is currently selected; and/or what page the user is currently viewing, among other factors. In the user interface view 200, the media file component 110 is operating in a recording mode 206, indicating that the media file component 110 is recording media content for a media file 104.

The user interface ribbon bar 202 may further include a bookmark icon 124 and a presentation surface 122. The presentation surface 122 may be used to record, store and present electronic notes in an electronic notebook. A user may enter notes in the presentation surface 122 while contemporaneously recording audio from a lecture using the user interface controls 204, for example. Before, after or during recording mode 206, a user may activate the bookmark icon 124 to initiate automatic bookmark generation operations to generate multiple electronic bookmarks 126 for the media file 104. For instance, whenever the bookmark application 140 is executing on a portable device such as a smart phone or tablet computer having a touch-screen display, the media bookmark component 130 may detect activation of the bookmark icon 124 based on haptic contact engagement with a touch-screen interface of the touch-screen display. Alternatively, a user may use an input device, such as a mouse pointer, touchpad or stylus button, to select and activate the bookmark icon 124.

FIG. 3 illustrates a user interface view 300. User interface view 300 is similar to user interface view 200 in that it illustrates a user interface view for an exemplary application program such as MICROSOFT ONENOTE. In the user interface view 300, the media file component 110 is operating in a playing mode 208, indicating that the media file component 110 is playing back ("playback") media content from a media file 104. Before, after or while in playing mode 208, a user may activate the bookmark icon 124 to initiate automatic bookmark generation operations to generate electronic bookmarks 126 for the media file 104.

FIG. 4 illustrates a user interface view 400. User interface view 400 is similar to user interface views 200, 300, in that it illustrates a user interface view for an exemplary application program such as MICROSOFT ONENOTE. In the user interface view 400, the media file component 110 is operating in a standby mode 210, indicating that the media file component 110 has suspended recording or playback of media content to/from a media file 104. During standby mode 210, the bookmark icon 124 may be rendered inactive by graying out the bookmark icon 124 to make it unselectable by the user.

Figure 5A:
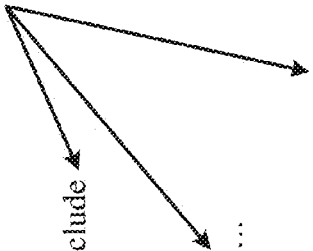
FIG. 5A illustrates an embodiment of a first user interface view of bookmarks.
Figure 5A:
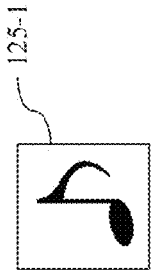
Figure 5A:
Figure 5A:

FIG. 5A illustrates a user interface view 500. As shown in user interface view 500, the media file component 110 may be arranged to provide a presentation surface 122 for a user interface 120. The presentation surface 122 may include, among other elements, a media file icon 125-1 representing a media file 104-1 (not shown) containing media content in the form of audio content, for example, from a lecture in Computer Science given on Monday May 4, 2015. The audio recording for the lecture was made on Monday May 4, 2015 starting at 1:53 PM. The name of the media file 104-1 is "Lecture1."

In addition to the media file icon 125-1, the presentation surface 122 includes various notes 502-g associated with the lecture, the notes presented in text form in various portions of the presentation surface 122. A user may generate the notes 502, for example, during recording mode 206 or playing mode 208 of the media file 104-1. Sometime before, after or while in recording mode 206 or playing mode 208, the user may select and activate the bookmark icon 124 (not shown) to automatically generate multiple electronic bookmarks 126 for the media file 104-1, such as bookmarks 126-1, 126-2, for example. The media bookmark component 130 may present the bookmarks 126-1, 126-2 as part of the presentation surface 122 in various positions within the presentation surface 122. In one embodiment, the media bookmark component 130 may select positions based on specific criteria, such as proximate to a position for notes 502 taken during times associated with the bookmarks 126-1, 126-2, respectively. Alternatively, the media bookmark component 130 may present the bookmarks 126 in a list on the presentation surface 122 or another presentation surface separate from the presentation surface 122. A particular position to present the bookmarks 126 may vary in accordance with a given implementation, and embodiments are not limited in this context.

The media bookmark component 130 may present the bookmarks 126-1, 126-2 in a defined format. In one embodiment, for example, a defined format may comprise the following format:

<Bookmark Identifier><"placed for"><Media File Name><Start Time>

For example, if a user activates the bookmark icon 124 at twenty-eight seconds into an audio track, the media bookmark component 130 may use the defined format provided above to generate the bookmark 126-1 as "Bookmark1 placed for Lecture1 at 0.28." Similarly, if a user activates the bookmark icon 124 at one minute and thirty-six seconds into an audio track, the media bookmark component 130 may use the defined format provided above to generate the bookmark 126-2 as "Bookmark2 placed for Lecture1 at 1.36." A particular format to present the bookmarks 126 may vary in accordance with a given implementation, and embodiments are not limited in this context.

In various embodiments, a bookmark 126 may include a playback icon 504-$h$. A playback icon 504 may be activated to reproduce media content from a media file 104 at a start time stored by a bookmark 126. As shown in the user interface 500, the bookmarks 126-1, 126-2 may each have a corresponding playback icon 504-1, 504-2, respectively. The playback icon 504-1 may be activated to reproduce the media file 104-1 at a first timestamp representing time information 106-1 for the media file 104-1, which in this case is at time 0.28. The playback icon 504-2 may be activated to reproduce the media file 104-1 at a first timestamp representing time information 106-1 for the media file 104-1, which in the case of bookmark 126-2 is at time 1.36.

In one embodiment, the playback icons 504-1, 504-2 may be constantly presented with the bookmarks 126-1, 126-2, respectively. In one embodiment, the playback icons 504-1, 504-2 may be presented in response to certain events, such as when a user hovers a pointer above the bookmarks 126-1, 126-2. Embodiments are not limited to these examples.

The media file component 110 may control playback operations for a media file 104, and reproduce media content for the media file 104 based on the bookmarks 126 generated for the media file 104. For example, the media file component 110 may control playback operations for the media file 104-1, and reproduce media content for the media file 104-1 (via an output device such as a speaker, text generated by audio transcription, and so forth), based on activation of the playback icons 504-1, 504-2 associated with the bookmarks 126-1, 126-2.

FIG. 5B illustrates a user interface view 550. As with the user interface view 500, the user interface view 550 illustrates the media file component 110 arranged to provide a presentation surface 122 for a user interface 120. The presentation surface 122 may include, among other elements, a media file icon 125-1 representing a media file 104-1 (not shown) containing media content in the form of audio content from a lecture in Computer Science given on Monday May 4, 2015. The audio recording for the lecture was made on Monday May 4, 2015 starting at 1:53 PM. The name of the media file 104-1 is "Lecture1." In addition, the presentation surface 122 may include, among other elements, a media file icon 125-2 representing a media file 104-2 (not shown) containing media content in the form of audio content, for example, from a lecture in Computer Science given on Monday May 4, 2015. The audio recording for the lecture was made subsequent to Lecture1 on Monday May 4, 2015 starting at 4:00 PM. The name of the media file 104-2 is "Lecture2."

User interface view 550 illustrates a case where multiple media files 104-1, 104-2 may be associated with a single presentation surface 122, with bookmarks 126 generated and presented for each of the media files 104-1, 104-2. As described previously with respect to the user interface view 500, the media bookmark component 130 may generate and present a pair of bookmarks 126-1, 126-3. The bookmark 126-1 may be a bookmark for the media file 104-1 titled "Lecture1." Activation of the playback icon 504-1 will result in reproduction of media content from the media file 104-1 at start time 0.28. The bookmark 126-3 may be a bookmark for the media file 104-2 titled "Lecture2." Activation of the playback icon 504-3 will result in reproduction of media content from the media file 104-2 at start time 0.15.

Figure 5C:
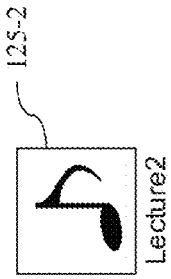
FIG. 5C illustrates an embodiment of a third user interface view of bookmarks.

FIG. 5C illustrates a user interface view 580. As with the user interface views 500, 550, the user interface view 580 illustrates the media file component 110 arranged to provide a presentation surface 122 for a user interface 120. The presentation surface 122 may include, among other elements, a media file icon 125-1 representing a media file 104-1 (not shown) containing media content in the form of audio content, for example, from a lecture in Computer Science given on Monday May 4, 2015. The audio recording for the lecture was made on Monday May 4, 2015 starting at 1:53 PM. The name of the media file 104-1 is "Lecture1." In addition, the presentation surface 122 may include, among other elements, a media file icon 125-2 representing a media file 104-2 (not shown) containing media content in the form of audio content, for example, from a lecture in Computer Science given on Monday May 4, 2015. The audio recording for the lecture was made subsequent to Lecture1 on Monday May 4, 2015 starting at 4:00 PM. The name of the media file 104-2 is "Lecture2."

User interface view 580 illustrates an embodiment in which a text segment 128-1 is presented for the bookmark 126-1. The text segment 128-1 represents text information translated from a defined portion of audio information stored in the media file 104-1. As with the bookmark 126-1, the media bookmark component 130 may present the text segment 128-1 as part of the presentation surface 122 in various positions within the presentation surface 122. In one embodiment, the media bookmark component 130 may select positions based on specific criteria, such as proximate to the bookmark 126-1 or a position for notes 502 taken near the bookmark 126-1. As shown in FIG. 5C, the text segment 128-1 may be positioned directly underneath the bookmark 126-1. Alternatively, the media bookmark component 130 may present the bookmark 126-1 and/or the text segment 128-1 in a list on the presentation surface 122 or another presentation surface separate from the presentation surface 122. A particular position to present the text segment 128-1 may vary in accordance with a given implementation, and embodiments are not limited in this context.

Figure 6:
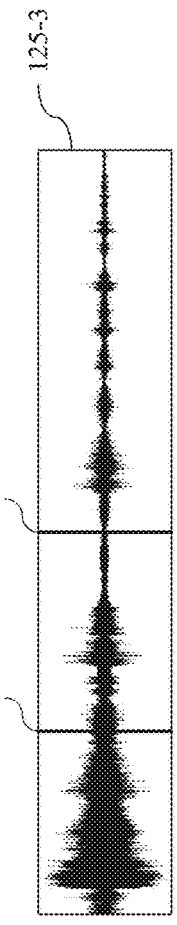
FIG. 6 illustrates an embodiment of a third user interface view of bookmarks.

FIG. 6 illustrates a user interface view 600. As with the user interface views 500, 550, the user interface view 600 illustrates the media file component 110 arranged to provide a presentation surface 122 for a user interface 120. The presentation surface 122 may include, among other elements, a media file icon 125-3 representing a media file 104-1 (not shown) containing media content in the form of audio content, for example, from a lecture in Computer Science given on Monday May 4, 2015. The audio recording for the lecture was made on Monday May 4, 2015 starting at 1:53 PM. The name of the media file 104-1 is "Lecture1."

User interface view 600 illustrates a case where a different type of media file icon 125 is used to visually represent the media file 104-1. The user interface view 600 includes a media file icon 125 presented as an audio waveform or audio seek bar. In addition to, or alternative from, the playback icons 504-1, 504-2 associated with the bookmarks 126-1, 126-2, respectively, the playback icons 504-3, 504-4 may be presented as time period separators overlaid on the audio waveform of the media file icon 125. A user may then choose to activate either of the playback icons 504-1, 504-3 to begin playback operations for the bookmark 126-1. Similarly, a user may choose to activate either of the playback icons 504-2, 504-4 to begin playback operations for the bookmark 126-2. This may enhance user experience and simply bookmark activation as a user would not need to scroll down a lengthy presentation surface 122 to activate playback operations for a particular bookmark 126.

The media file icon 125 may be generated in a number of different ways. For instance, during audio recording, a waveform may be displayed near the top of the screen that scrolls from right to left which represents the audio content being recorded by a microphone. The waveform will serve multiple purposes. First, it acts as an input level meter so the user can determine whether the audio recording is too loud or too quiet. Second, when the user adds bookmarks or other audio synchronization points, markers are drawn on the waveform to show them that a new bookmark 126 has been linked to the audio recording.

One embodiment defines an exemplary visual design for a media file icon 125 suitable for implementation by a mobile device executing a mobile operating system, such as APPLE® iOS® or GOOGLE® Android®, for example. The visual design may include a few basic attributes. When a recording is first started, most of the screen space devoted to the waveform will be blank. Over the first few seconds of the recording, the waveform will fill in from right to left until it fills up the entire blank space, and then continue scrolling in that direction as the recording proceeds. The full width of the waveform may correspond, for example, to a defined span of the audio recording. For instance, the defined span may be selected or tuned to match a particular device or application, such as a voice memo application of a particular mobile device (e.g., which spans 5 seconds). In this case, the defined span for the waveform could use a slightly shorter timespan (e.g., 4 seconds) as a smartphone will have less horizontal screen space available for presentation. The waveform displays only a single audio channel (Y>=0). When audio recordings are in mono, screen real estate may be conserved by not showing the portion of the waveform that falls below the X-axis. At full-width, the waveform may comprise a series of approximately 80 vertical bars of equal width. Since the full audio waveform will span a 4-second time period, this means each bar will correspond to approximately 0.05 seconds of audio. Thus, loudness of the audio is sampled every 0.05 seconds. The height of each bar represents the loudness of the audio, and will be determined by the value returned by an averagePowerForChannel method of the iOS AVAudioRecorder class at a given time. A maximum-height bar indicates that averagePowerForChannel returned a value>=0 dB, while a zero-height bar indicates that it returned a value<=−160 dB. When a bookmark 126 or other audio synchronization point is added, the corresponding bar on the audio waveform is changed to a different color to indicate that the new bookmark 126 has been linked to the audio recording. This change in color can be accompanied by an animation to draw attention to it. Next to the waveform, a time counter may be presented to show a current length of the audio recording. This counter will start at 0:00 and update each second to show the new elapsed time. As the recording grows in length, more digits are added to the time counter as needed, e.g., another digit is added at the 10-minute mark to display 10:00, a digit and a colon at the 1-hour mark is added to display 1:00:00, and a digit at the 10-hour mark is added to display 10:00:00. A maximum recording length will a total number of digits that need to be added. It may be appreciated that this is merely one visual design possible for the media file icon 125, and details for a particular visual design for the waveform can vary based on a given implementation.

Figure 7A:
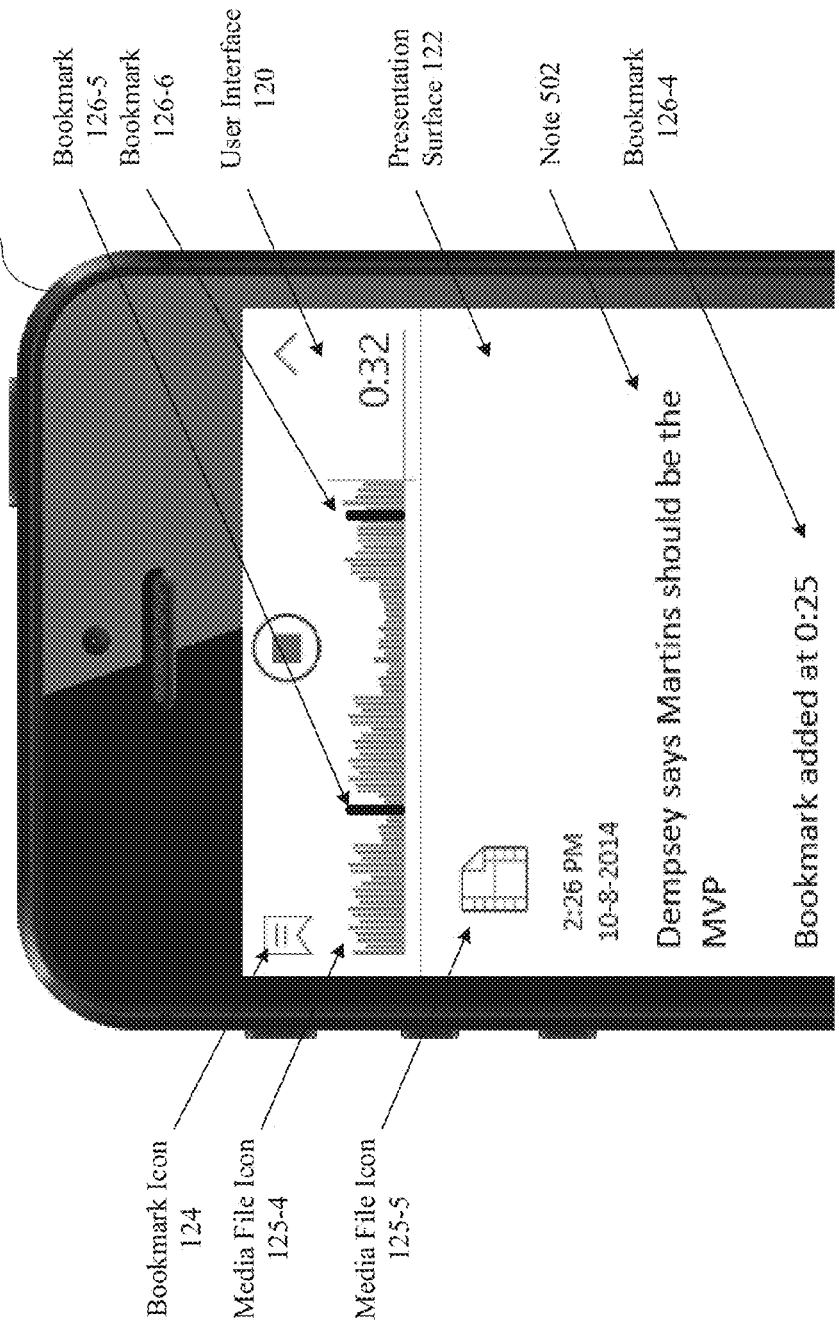
FIG. 7A illustrates an embodiment of a fourth user interface view of bookmarks.

FIG. 7A illustrates a user interface view 700. User interface view 700 illustrates a more detailed user interface view for an exemplary application program such as MICROSOFT ONENOTE operating on a mobile device, such as smartphone, for example. Further, the user interface view 700 illustrates a user interface configuration suitable for use during a recording mode 206.

As shown in the user interface view 700, a mobile device 702 may include a user interface 120 to present various user interface elements for MICROSOFT ONENOTE. The user interface 120 may include a presentation surface 122 to present a bookmark icon 124, media file icons 125-4, 125-5, notes 502, and a bookmark 126-4. The media file icon 125-4 is implemented as an audio seek bar with bookmarks 126-5, 126-6 overlaid at time periods corresponding to specific times when the bookmarks 126-5, 126-6 were created. The bookmarks 126-5, 126-6 may be the same or different from other bookmarks on the presentation surface 122, such as the bookmark 126-4. Alternatively, the bookmarks 126-5, 126-6 may be playback icons 504 for other bookmarks on the presentation surface 122. Embodiments are not limited in this context.

Figure 7B:
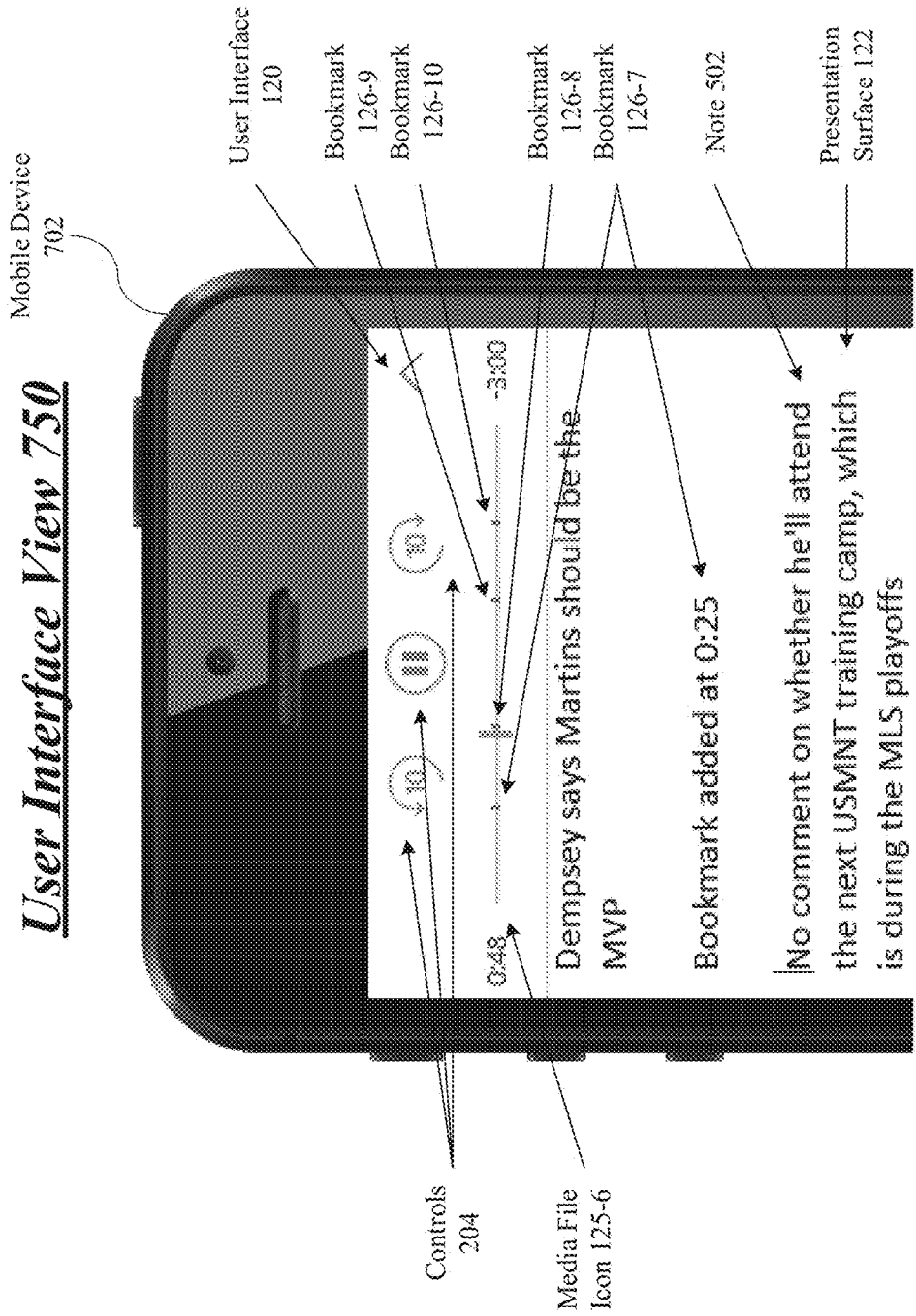
FIG. 7B illustrates an embodiment of a fifth user interface view of bookmarks.

FIG. 7B illustrates a user interface view 750. User interface view 750 illustrates a more detailed user interface view for an exemplary application program such as MICROSOFT ONENOTE operating on a mobile device, such as smartphone, for example. Further, the user interface view 750 illustrates a user interface configuration suitable for use during a playing mode 208.

As shown in the user interface view 750, a mobile device 702 may include a user interface 120 to present various user interface elements for MICROSOFT ONENOTE. The user interface 120 may include a presentation surface 122 to present a media file icon 125-6, notes 502, and various bookmarks 126-7, 126-8, 126-9 and 126-10. The media file icon 125-6 is implemented as an audio seek bar with bookmarks 126-7, 126-8, 126-9 and 126-10 overlaid at time periods corresponding to specific times when the bookmarks 126-7, 126-8, 126-9 and 126-10 were created. The bookmarks 126-7, 126-8, 126-9 and 126-10 may be the same or different from other bookmarks on the presentation surface 122, such as the bookmark 126-7 which is shown as a text representation above the note 502 and also as a hash mark on the media file icon 125-6. Alternatively, the bookmarks 126-7, 126-8, 126-9 and 126-10 may be playback icons 504 for other bookmarks on the presentation surface 122. Embodiments are not limited in this context.

Figure 7C:
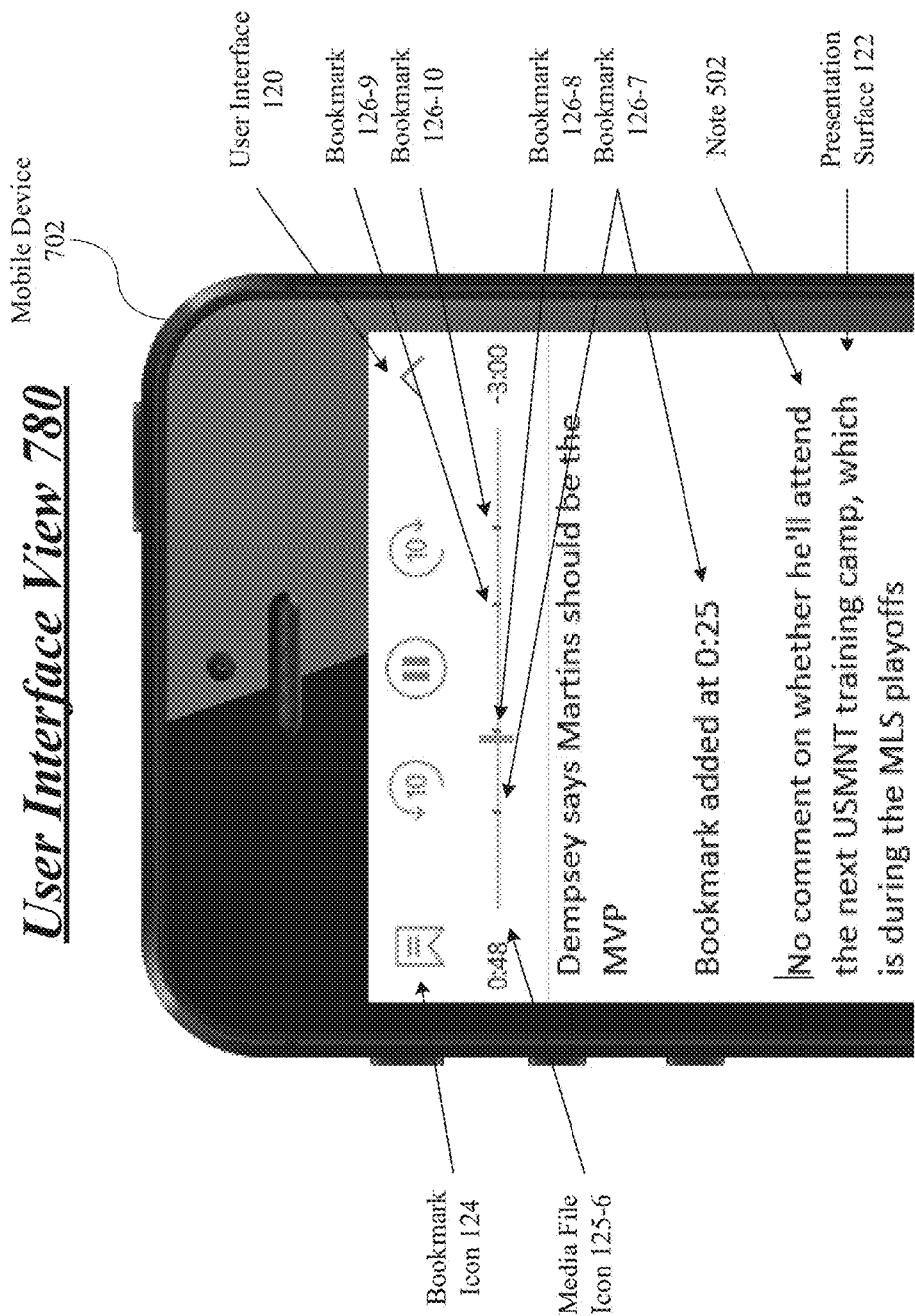
FIG. 7C illustrates an embodiment of a sixth user interface view of bookmarks.

FIG. 7C illustrates a user interface view 780. User interface view 780 illustrates a more detailed user interface view for an exemplary application program such as MICROSOFT ONENOTE operating on a mobile device, such as smartphone, for example. Further, the user interface view 780 illustrates a user interface configuration suitable for use during a playing mode 208.

As shown in the user interface view 780, a mobile device 702 may include a user interface 120 to present various user interface elements for MICROSOFT ONENOTE. As with the user interface view 750, the user interface 120 may include a presentation surface 122 to present a media file icon 125-6, notes 502, and various bookmarks 126-7, 126-8, 126-9 and 126-10. In addition, the user interface view 780 includes a bookmark icon 124 that may be used to initiate automatic bookmark generation operations to automatically (e.g., without human or manual intervention) create bookmarks 126 before, after or during playing mode 208 of the application. The media file icon 125-6 is implemented as an audio seek bar with bookmarks 126-7, 126-8, 126-9 and 126-10 overlaid at time periods corresponding to specific times when the bookmarks 126-7, 126-8, 126-9 and 126-10 were created. The bookmarks 126-7, 126-8, 126-9 and 126-10 may be the same or different from other bookmarks on the presentation surface 122, such as the bookmark 126-7 which is shown as a text representation above the note 502 and also as a hash mark on the media file icon 125-6. Alternatively, the bookmarks 126-7, 126-8, 126-9 and 126-10 may be playback icons 504 for other bookmarks on the presentation surface 122. Embodiments are not limited in this context.

As previously discussed, operations associated with the bookmark icon 124 may also be implemented using other input techniques, such as certain types of haptic contact on a touch-screen display or voice commands. With respect to the latter technique, speech recognition technology may be used to intelligently add bookmarks automatically based on the contents of the user's recording. We could listen for specific keywords or phrases that might denote that important information has been vocalized, such as "Bookmark that" or "Remember that" or "Follow up on that" or "This is important" or a user's first or last name or some other recognized voice command. When a recognized voice command is detected, a bookmark 126 can be added at a corresponding time in the recording.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 8A illustrates one embodiment of a logic flow 800 for generating a bookmark for a media file. The logic flow 800 may be representative of some or all of the operations executed by one or more embodiments described herein, such as the media file component 110 and/or the media bookmark component 130 of the bookmark application 140.

In the illustrated embodiment shown in FIG. 8A, the logic flow 800 may identify a media file to store media information at block 802. For example, the media file component 110 may identify a media file 104 to store media information. The identified media file 104 may have been created by a given application and a given user, which may be the same or different from the application or user creating bookmarks for the media file 104.

The logic flow 800 may optionally receive a control directive to automatically generate a bookmark for the media file at block 804. For example, the media bookmark component 130 may present a bookmark icon 124 for the media file 104 on a user interface 120. The bookmark icon 124 may be visually presented by the user interface 120. When a user selects the bookmark icon 124, the media bookmark component 130 may initiate automatic bookmark generation operations to generate a bookmark 126. Additionally or alternatively, a user can use a keyboard command such as defined short-cut key combinations to perform operations for the bookmark icon 124.

The media bookmark component 130 may detect activation of the bookmark icon 124 by a user. In one embodiment, the media bookmark component 130 may detect activation of the bookmark icon 124 before, during or after recording operations (e.g., recording mode 206) of media content for the media file 104. In one embodiment, the media bookmark component 130 may detect activation of the bookmark icon 124 before, during or after playback operations (e.g., playing mode 208) of media content for the media file 104. In one embodiment, the media bookmark component 130 may detect activation of the bookmark icon 124 based on haptic contact engagement with a touch-screen interface of a touch-screen display of an electronic device, such as a smart phone, smart watch, tablet computer, or other electronic device. Alternatively, the media bookmark component 130 may detect activation of the bookmark icon 124 based on voice commands.

The logic flow 800 may scan the media file for a bookmark indicator at block 806. For instance, the media bookmark component 130 may receive a control directive to begin bookmark generation operations, and begin scanning the media file 104 for one or more bookmark indicators 132, such as keywords 134 and/or identities 136.

The logic flow 800 may generate a bookmark for the media file based on the bookmark indicator at block 808. For example, the media bookmark component 130 may detect a bookmark indicator 132, retrieve time information 106 for the media file 104 corresponding to the bookmark indicator 132, and generate a bookmark 126 for the media file 104 based on the retrieved time information 106 for the media file 104.

The logic flow 800 may optionally generate a text segment for the bookmark at block 810. For example, the media bookmark indicator 130 may generate a text segment 128 for the bookmark 126 using an audio length parameter. The audio length parameter may be used to retrieve text information converted from audio information corresponding to a time interval indicated by the audio length parameter.

The logic flow 800 may present the bookmark and/or the text segment on a user interface at block 812. For example, the media bookmark component 130 may present the bookmark 126 and/or the text segment 128 on a presentation surface 122 of the user interface 120. The bookmark 126 may be presented using any number of different types of multimedia information, such as a text based bookmark embedded within notes presented on the presentation surface 122, colored or otherwise identifiable markings on an audio waveform, in a different user interface view separate from the presentation surface 122, or other user interface element.

For visually-impaired users, the bookmark 126 and/or the text segment may be presented audible via text-to-speech (TTS) techniques when a user activates a defined user interface element or brings focus on a particular bookmark or note near a bookmark.

FIG. 8B illustrates one embodiment of a logic flow 820 for scanning a media file for a bookmark indicator. The logic flow 820 may be representative of some or all of the operations executed by one or more embodiments described herein, such as the media file component 110 and/or the media bookmark component 130 of the bookmark application 140.

In the illustrated embodiment shown in FIG. 8B, the logic flow 820 may scan the media file for a bookmark indicator at block 806. For instance, the media bookmark component 130 may receive a control directive to begin bookmark generation operations, and begin scanning the media file 104 for one or more bookmark indicators 132, such as keywords 134 and/or identities 136.

The logic flow 820 may convert audio information from the media file to text information at block 824. For example, the STT component 150 may receive audio information from a microphone when in recording mode, or stored in a media file 104 when in playing back mode, and convert the audio information to text information using various STT techniques. The text information and temporal information may be stored in a data structure for later retrieval by the media bookmark component 130, or streamed in real-time or near real-time directly to the media bookmark component 130.

The logic flow 820 may detect one or more keywords from the text information as the bookmark indicator at block 826. For example, the media bookmark component 130 may retrieve text information from the data structure, or receive text information directly from the STT component 150, and compare to a bookmark indicator 132-1 in the form of a set of keywords 134. When the media bookmark component 130 finds a match, the media bookmark component 130 may generate a bookmark 126 and/or a text segment 128.

FIG. 8C illustrates one embodiment of a logic flow 840 for scanning a media file for a bookmark indicator. The logic flow 840 may be representative of some or all of the operations executed by one or more embodiments described herein, such as the media file component 110 and/or the media bookmark component 130 of the bookmark application 140.

In the illustrated embodiment shown in FIG. 8C, the logic flow 840 may scan the media file for a bookmark indicator at block 806. For instance, the media bookmark component 130 may receive a control directive to begin bookmark generation operations, and begin scanning the media file 104 for one or more bookmark indicators 132, such as keywords 134 and/or identities 136.

The logic flow 840 may perform voice recognition to determine identity information for a source of the audio information at block 842. For example, the voice recognition component 160 may receive audio information from a microphone when in recording mode, or stored in a media file 104 when in playing back mode, and identify various speakers from the audio recording. Identity information and temporal information may be stored in a data structure for later retrieval by the media bookmark component 130, or streamed in real-time or near real-time directly to the media bookmark component 130.

The logic flow 840 may detect an identity from the identity information as the bookmark indicator at block 844. For example, the media bookmark component 130 may retrieve identity information from the data structure, or receive identity information directly from the voice recognition component 160, and compare to a bookmark indicator 132-2 in the form of a set of identities 136. When the media bookmark component 130 finds a match, the media bookmark component 130 may generate a bookmark 126 and/or a text segment 128.

FIG. 8D illustrates one embodiment of a logic flow 860 for generating a bookmark for a media file. The logic flow 860 may be representative of some or all of the operations executed by one or more embodiments described herein, such as the media file component 110 and/or the media bookmark component 130 of the bookmark application 140.

The logic flow 860 may generate a bookmark for the media file based on the bookmark indicator at block 808. For example, the media bookmark component 130 may detect a bookmark indicator 132, retrieve time information 106 for the media file 104 corresponding to the bookmark indicator 132, and generate a bookmark 126 for the media file 104 based on the retrieved time information 106 for the media file 104.

The logic flow 860 may retrieve a text segment corresponding to a defined portion of audio information of the media file based on the bookmark at block 862. For example, the media bookmark component 130 may convert audio information from the media file 104 to text information based on the bookmark 126. The media bookmark component 130 may retrieve a text segment 128 from text information and associated temporal information stored in a data structure using an audio length parameter associated with the bookmark 126. The audio length parameter may indicate temporal information, such as a start time and end time for a time interval. The media bookmark component 130 may use the audio length parameter to locate text information corresponding to the time interval by examining the temporal information stored with the text information, such as timestamps indicating when the text information occurs as audio information in the media file 104.

The logic flow 860 may present the bookmark and the text segment on a presentation surface of an application program at block 864. For example, the media bookmark component 130 may present the bookmark 126 and/or the text segment 128 on a presentation surface 122 of the user interface 120. The bookmark 126 may be presented using any number of different types of multimedia information, such as a text based bookmark embedded within notes presented on the presentation surface 122, colored or otherwise identifiable markings on an audio waveform, in a different user interface view separate from the presentation surface 122, or other user interface element. For visually-impaired users, the bookmark 126 and/or the text segment may be presented audible via text-to-speech (TTS) techniques when a user activates a defined user interface element or brings focus on a particular bookmark or note near a bookmark.

FIG. 9 illustrates one embodiment of a logic flow 900 for generating a bookmark for a media file. The logic flow 900 may be representative of some or all of the operations executed by one or more embodiments described herein, such as the media file component 110 and/or the media bookmark component 130 of the bookmark application 140.

In the illustrated embodiment shown in FIG. 9, the logic flow 900 may retrieve a first timestamp representing a time index for the media file at block 902. For example, the media bookmark component 130 may retrieve a first timestamp representing a time index for the media file 104 from the time information 106. The media bookmark component 130 may then generate the bookmark 126 to include the first timestamp representing time information 106 for the media file 104, the first timestamp corresponding to a start time when the bookmark icon is activated (e.g., selected and activated by a user).

The logic flow 900 may optionally retrieve a second timestamp representing a time index for the media file at block 904. For example, the media bookmark component 130 may retrieve a second timestamp representing a time index for the media file 104 from the time information 106. The media bookmark component 130 may then generate the bookmark 126 to include a second timestamp representing time information 106 for the media file 104, the second timestamp corresponding to an end time for a media file segment of the media file 104, wherein the second timestamp is subsequent to the first timestamp. The second timestamp may correspond to selection of a user interface element, such as the bookmark icon 124 or a completely different user interface element. For instance, the bookmark icon 124 may have a toggle mode where a first activation corresponds to a first timestamp and a second activation corresponds to a second timestamp. Alternatively, the second timestamp may correspond to a defined time interval (e.g., 5 m increments), a length of pauses between speech utterances, keywords, and so forth.

The logic flow 900 may optionally retrieve a file identifier for the media file at block 906. For example, the media bookmark component 130 may retrieve a file identifier for the media file 104 from a data store for the media file 104. Alternatively, the media bookmark component 130 may request the file identifier from the media file component 110. The file identifier may comprise, for example, a file name, a globally unique identifier (GUID), a locally unique identifier, machine-generated identifier, and so forth.

The logic flow 900 may generate a bookmark for the media file with the first timestamp, the second timestamp, and/or the file identifier at block 908. For example, the media bookmark component 130 may generate a bookmark 126 for the media file with the first timestamp, the second timestamp, and/or the file identifier. The media bookmark component 130 may store the bookmark 126 as metadata for the media file 104. The bookmark 126 may be stored with the media file 104 or separate from the media file 104 in a local or remote datastore.

In one embodiment, the bookmark 126 may include only the first timestamp. Once the bookmark 126 is activated, the media file component 110 may begin reproducing media content from the media file 104 at a time indicated by the first timestamp and continue playback until terminated by a user.

In one embodiment, the bookmark 126 may include the first timestamp and the file identifier. Once the bookmark 126 is activated, the media file component 110 may begin reproducing media content from a particular media file 104-1, 104-2 as identified by the file identifier at a time indicated by the first timestamp until terminated by a user. This may be particularly useful when there are multiple media files 104-1, 104-2 associated with a single presentation surface 122, among other use scenarios.

In one embodiment, the bookmark 126 may include the first timestamp and the second timestamp. Once the bookmark 126 is activated, the media file component 110 may begin reproducing media content from the media file 104 at a time indicated by the first timestamp and stop playback at a time indicated by the second timestamp. The first and second timestamps effectively identify a media segment or media clip of the media file 104.

In one embodiment, the bookmark 126 may include the first timestamp, the second timestamp and the file identifier. Once the bookmark 126 is activated, the media file component 110 may begin reproducing media content from the media file 104 at a time indicated by the first timestamp and stop playback at a time indicated by the second timestamp. The first and second timestamps effectively identify a media segment or media clip of the media file 104, while the file identifier effectively identifies a particular media file 104 from among multiple media files 104-1, 104-2.

Figure 10:
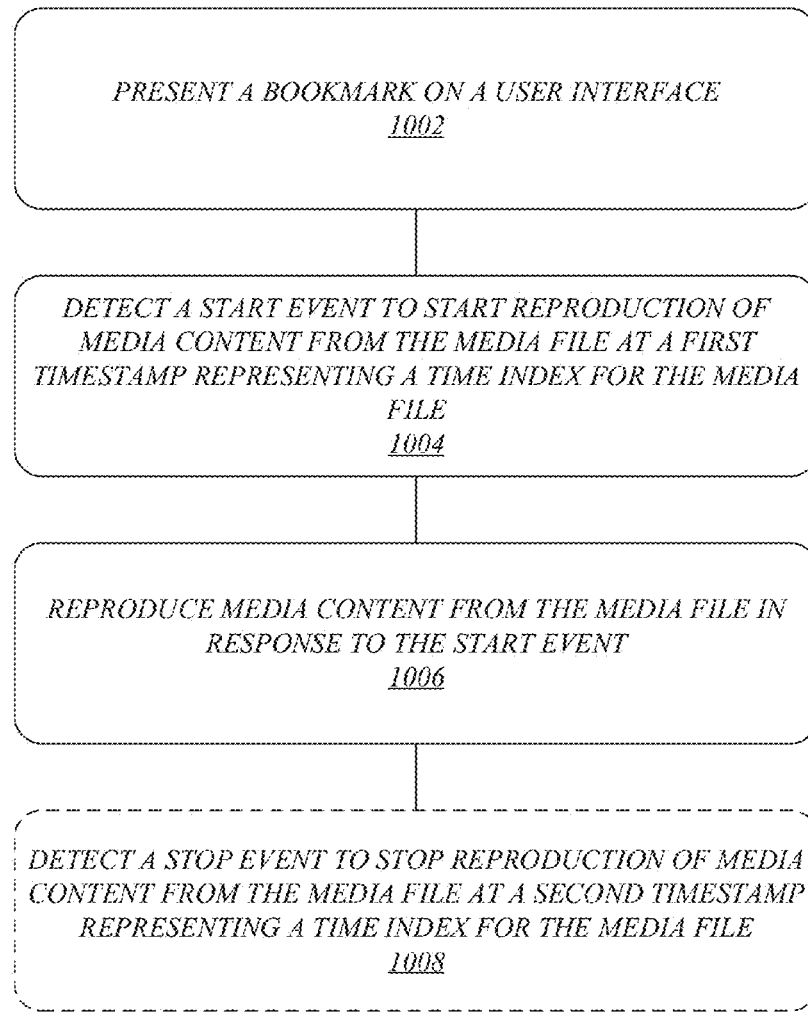
FIG. 10 illustrates an embodiment of a sixth logic flow for reproducing bookmarked media content from a media file.

FIG. 10 illustrates one embodiment of a logic flow 1000 for reproducing bookmarked media content from a media file. The logic flow 1000 may be representative of some or all of the operations executed by one or more embodiments described herein, such as the media file component 110 and/or the media bookmark component 130 of the bookmark application 140.

In the illustrated embodiment shown in FIG. 10, the logic flow 1000 may present a bookmark on a user interface at block 1002. For example, the media bookmark component 130 may present the bookmark 126 on a presentation surface 122 of an application program. The media bookmark component 130 may also present the bookmark 126 with a playback icon 504 to reproduce the media file at a first timestamp representing time information 106 for the media file 104. Additionally or alternatively, the media bookmark component 130 may present the bookmark 126, or a playback icon 504 for the bookmark 126, on a visual representation of the media file 104, such as a media file icon 125-3.

The logic flow 1000 may detect a start event to start reproduction of media content from the media file at a first timestamp representing time information for the media file at block 1004. For example, the media bookmark component 130 may detect a start event to cause the start of reproduction (e.g., start playing mode 208) of media content from the media file 104 at a first timestamp representing time information 106 for the media file 104. An example of a start event may be activation of a playback icon 504 associated with a bookmark 126.

The logic flow 100 may optionally detect a stop event to stop reproduction of media content from the media file at a second timestamp representing time information for the media file at block 1006. For example, the media bookmark component 130 may detect a stop event to cause the stop of reproduction (e.g., stop playing mode 208 or enter standby mode 210) of media content from the media file 104 at a second timestamp representing time information 106 for the media file 104. An example of stop event may be activation of a user interface control 204 to stop reproduction of the media file 104. Another example of a stop event may be reaching the second timestamp during playback operations.

In various embodiments, the bookmark application 140 may be configured for various single user scenarios. For example, multiple users may each have their own copy or version of a media file 104 and manage their bookmarks 126 accordingly. In addition, a user may manage and select various properties or attributes for a set of bookmarks 126 to customize the set of bookmarks 126 to the user. Each user may configure bookmarks 126 to have a different color, user identifier, bookmark identifier, text information, audio information, visual information, and so forth. The user may also customize various properties or attributes for a set of bookmarks 126 for certain tasks, such as taking notes, follow up, distribution, publication, sharing, and so forth.

In various embodiments, the bookmark application 140 may be configured for various collaboration scenarios. As previously described, multiple users may each have their own copy or version of a media file 104 and manage their bookmarks 126 accordingly. In some cases, however, multiple users may share a single media file 104, such as a media recording in a shared notebook. In such situations, the media bookmark component 130 may generate different bookmarks 126 corresponding to different users. The different bookmarks 126 may be visualized by modifying certain attributes or properties for each bookmark 126, such as assigning each user and corresponding bookmark 126 through use of a different color, user identifier, bookmark identifier, text information, audio information, visual information, and so forth.

Figure 11:
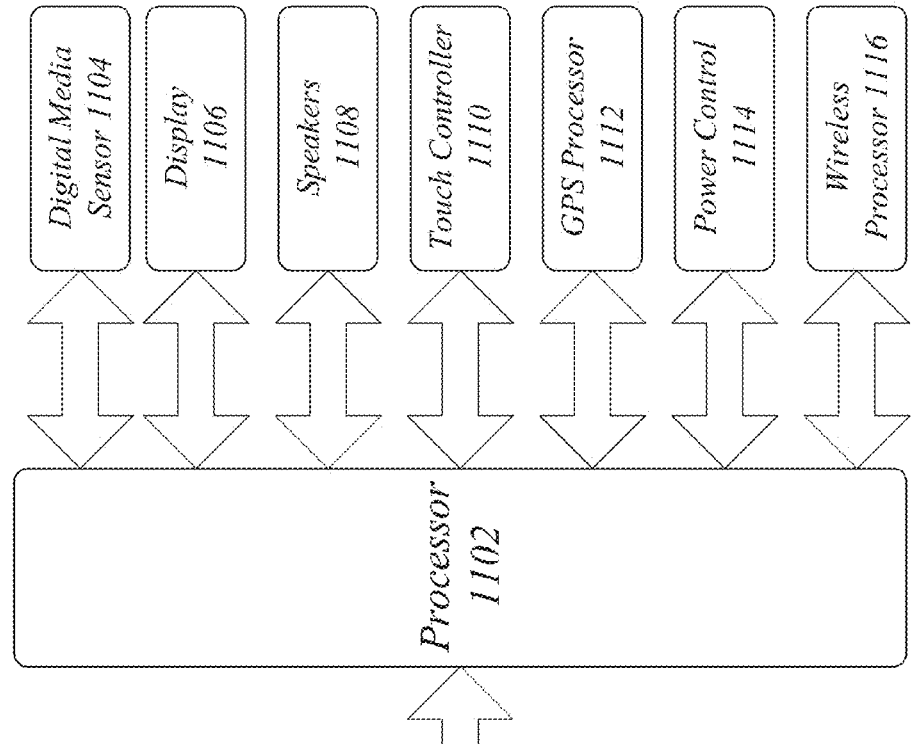
FIG. 11 illustrates an embodiment of a first suitable computing architecture.
Figure 11:
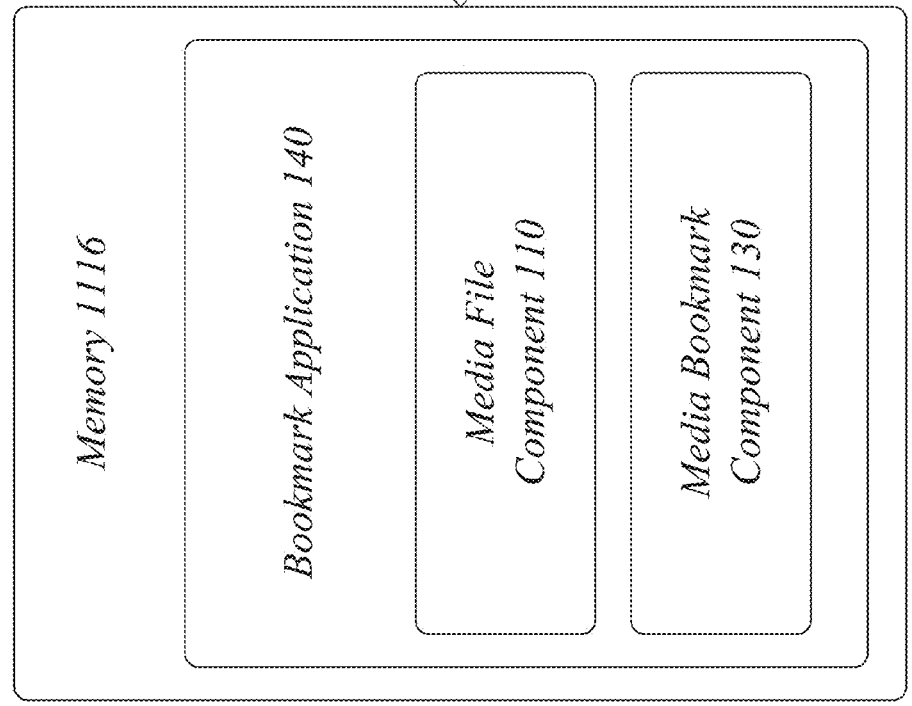

FIG. 11 illustrates an electronic device 1100 suitable for implementing various embodiments as previously described. In one embodiment, the electronic device 1100 is a wireless mobile device, such as a smartphone, smartwatch or tablet computer. The electronic device 1100 may include a processor 1102 in communication with a memory 1116. The processor 1102 may be a central processing unit and/or a graphics processing unit. The memory 1116 is a combination of flash memory and random access memory. The memory 1116 stores a bookmark application 140 to implement operations of various embodiments as previously described. The bookmark application 140 includes executable instructions for the media file component 110 and the media bookmark component 130.

The processor 1102 is also coupled to digital media sensors 1104. The digital media sensors 1104 may comprise, for example, image sensors, such as charge coupled devices. The image sensors capture visual media, which is presented on display 1106. The image sensors capture visual media and present the visual media on the display 1106 so that a user can observe the captured visual media. The digital media sensors 1104 may also comprise, for example, audio sensors, such as microphone devices. The audio sensors capture auditory media, which is reproduced via speakers 1108. Other digital media sensors 1104 (e.g., thermal sensors, altitude sensors, biometric sensors, etc.) may also be added based on a given implementation. Embodiments are not limited in this context.

A touch controller 1110 is connected to the display 1106 and the processor 1102. The touch controller 1110 is responsive to haptic signals applied to the display 1106. In one embodiment, the bookmark application 140 presents various user interface views on the display 1106. That is, the bookmark application 140 includes executable instructions executed by the processor 1102 to present various user interface views on the display 1106.

The bookmark application 140 communicates with the processor 1102 regarding haptic signals applied to the display 1106, which are recorded by the touch controller 1110. In one configuration, the bookmark application 140 processes haptic signals applied to the bookmark icons 124 and the playback icons 504, and determines whether to generate a bookmark 126 or playback a media file associated with the bookmark 126, as previously described.

The electronic device 1100 may also include other components commonly associated with a smartphone, smartwatch or tablet computer, such as a global positioning system (GPS) processor 1112, a power control circuit 1114 and a wireless signal processor 1116. Embodiments are not limited in this context.

Figure 12:
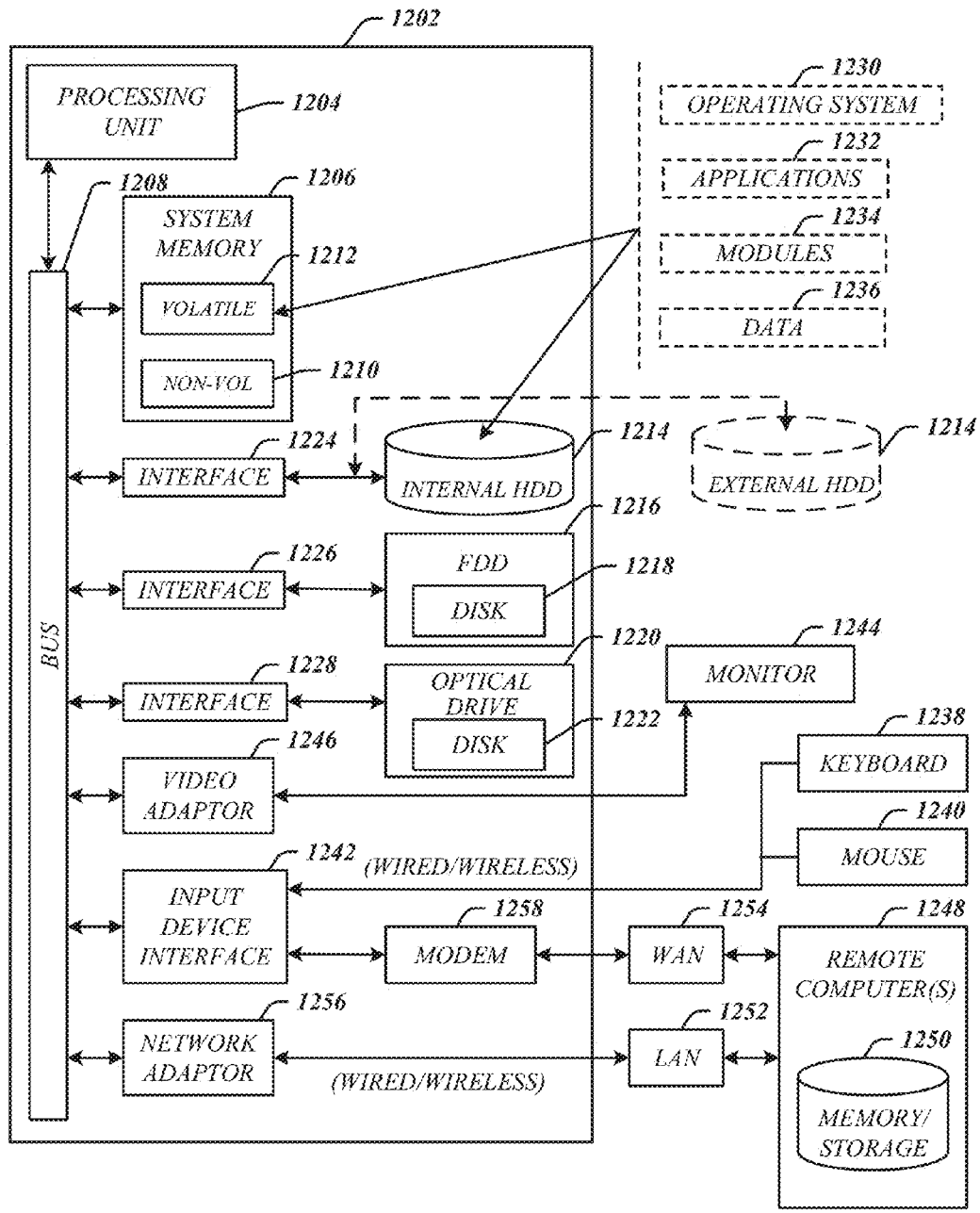
FIG. 12 illustrates an embodiment of a second suitable computing architecture.

FIG. 12 illustrates an embodiment of an exemplary computing architecture 1200 suitable for implementing various embodiments as previously described. The computing architecture 1200 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1200.

As shown in FIG. 12, the computing architecture 1200 comprises a processing unit 1204, a system memory 1206 and a system bus 1208. The processing unit 1204 can be any of various commercially available processors. Dual microprocessors and other multi-processor architectures may also be employed as the processing unit 1204. The system bus 1208 provides an interface for system components including, but not limited to, the system memory 1206 to the processing unit 1204. The system bus 1208 can be any of several types of bus structure that may further interconnect to a memory bus (with or without a memory controller), a peripheral bus, and a local bus using any of a variety of commercially available bus architectures.

The system memory 1206 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 12, the system memory 1206 can include non-volatile memory 1210 and/or volatile memory 1212. A basic input/output system (BIOS) can be stored in the non-volatile memory 1210.

The computer 1202 may include various types of computer-readable storage media, including an internal hard disk drive (HDD) 1214, a magnetic floppy disk drive (FDD) 1216 to read from or write to a removable magnetic disk 1218, and an optical disk drive 1220 to read from or write to a removable optical disk 1222 (e.g., a CD-ROM or DVD). The HDD 1214, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1210, 1212, including an operating system 1230, one or more application programs 1232, other program modules 1234, and program data 1236. The one or more application programs 1232, other program modules 1234, and program data 1236 can include, for example, the bookmark application 140, the media file component 112, the media bookmark component 130, the security component 536, the publishing component 532, the message component 534, the user interface 538, and the messaging application 542.

A user can enter commands and information into the computer 1202 through one or more wire/wireless input devices, for example, a keyboard 1238 and a pointing device, such as a mouse 1240. Other input devices may include a microphone, an infra-red (IR) remote control, a joystick, a game pad, a stylus pen, touch screen, or the like. These and other input devices are often connected to the processing unit 1204 through an input device interface 1242 that is coupled to the system bus 1208, but can be connected by other interfaces such as a parallel port, IEEE 1394 serial port, a game port, a USB port, an IR interface, and so forth.

A monitor 1244 or other type of display device is also connected to the system bus 1208 via an interface, such as a video adaptor 1246. In addition to the monitor 1244, a computer typically includes other peripheral output devices, such as speakers, printers, and so forth.

The computer 1202 may operate in a networked environment using logical connections via wire and/or wireless communications to one or more remote computers, such as a remote computer 1248. The remote computer 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wire and/or wireless communication network interface or adaptor 1256. The adaptor 1256 can facilitate wire and/or wireless communications to the LAN 1252, which may also include a wireless access point disposed thereon for communicating with the wireless functionality of the adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, connects to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a processor;
a storage device having instructions for a bookmark application stored thereon, that when executed by the processor direct the apparatus to:
   scan a media file to detect a bookmark indicator from media content of the media file, wherein the bookmark indicator comprises information in the media file that triggers creation of a bookmark;
   in response to detecting the bookmark indicator, automatically generate a new bookmark for the media file and store the new bookmark as metadata of the media file, and
   present a visual indication of the new bookmark and the bookmark indicator on a user interface.

2. The apparatus of claim 1, wherein the bookmark indicator comprises relevant keywords, wherein instructions to scan the media file to detect the bookmark indicator from the media content of the media file direct the apparatus to:
   convert audio information from the media file to text information; and
   detect one or more keywords from the text information as the bookmark indicator.

3. The apparatus of claim 1, wherein the bookmark indicator comprises relevant speaker identities, wherein instructions to scan the media file to detect the bookmark indicator from the media content of the media file direct the apparatus to:

perform voice recognition to determine identity information for a source of audio information of the media file; and a speaker identity from the identity information as the bookmark indicator.

4. The apparatus of claim 1, further comprising instructions that direct the apparatus to:

retrieve a text segment corresponding to a defined portion of audio information of the media file based on the bookmark indicator, and present the text segment on a presentation surface of the user interface.

5. The apparatus of claim 1, wherein the new bookmark comprises a first timestamp representing a start time for a media file segment of the media file, a second timestamp representing an end time for the media file segment of the media file, and an identifier for the media file.

6. The apparatus of claim 1, further comprising instructions that direct the apparatus to:

present a playback icon in association with the indication of the new bookmark, wherein the playback icon is selectable to reproduce the media file at a first timestamp representing time information for the new bookmark.

7. The apparatus of claim 1, further comprising instructions that direct the apparatus to:

manage the media file by controlling playback operations for the media file and reproducing media content for the media file based on the new bookmark.

8. The apparatus of claim 1, further comprising a digital media sensor for recording media content for the media file.

9. A method implemented in hardware, comprising:

scanning the media file to detect a bookmark indicator from media content of the media file, wherein the bookmark indicator comprises information in the media file that triggers creation of a bookmark;

in response to detecting the bookmark indicator from the media information, generating a new bookmark for the media file; and presenting a visual indication of the new bookmark and the bookmark indicator on a user interface of a computing device.

10. The method of claim 9, wherein the bookmark indicator comprises relevant keywords, wherein scanning the media file to detect the bookmark indicator comprises:

converting audio information from the media file to text information; and detecting one or more keywords from the text information as the bookmark indicator.

11. The method of claim 9, wherein the bookmark indicator comprises relevant speaker identities, wherein scanning the media file to detect the bookmark indicator comprises:

performing voice recognition to determine identity information for a source of audio information of the media file; and detecting a speaker identity from the identity information as the bookmark indicator.

12. The method of claim 9, further comprising in response to detecting the bookmark indicator:

retrieving a text segment corresponding to a defined portion of audio information of the media file based on the bookmark indicator, wherein the bookmark indicator comprises relevant keywords or relevant speaker identities; and presenting the text segment on a presentation surface of the user interface.

13. The method of claim 9, wherein generating the new bookmark for the media file comprises generating the new bookmark to include a first timestamp representing time information for the media file, the first timestamp corresponding to a time when the bookmark indicator occurs.

14. The method of claim 9, wherein generating the new bookmark for the media file comprises generating the new bookmark to include a second timestamp representing time information for the media file, the second timestamp corresponding to an endpoint for a media file segment of the media file, wherein the second timestamp is subsequent to a first timestamp corresponding to a time when the bookmark indicator occurs.

15. The method of claim 9, wherein generating the new bookmark for the media file comprises generating the bookmark to include an identifier for the media file.

16. The method of claim 9, further comprising storing the new bookmark as metadata for the media file.

17. The method of claim 9, wherein the user interface comprises a presentation surface of an application program, wherein the indication of the new bookmark is presented on the presentation surface of the application program.

18. The method of claim 9, wherein presenting the indication of the new bookmark comprises presenting the visual indicator of the bookmark on a representation of the media file.

19. The method of claim 9, further comprising presenting a playback icon in connection with the indication of the new bookmark, wherein the playback icon is selectable to reproduce the media file at a first timestamp representing time information for the new bookmark.

20. The method of claim 9, further comprising detecting a start event to start reproduction of media content from the media file at a first timestamp representing time information for the new bookmark.

21. The method of claim 20, further comprising detecting a stop event to stop reproduction of media content from the media file at a second timestamp representing time information for the new bookmark.

* * * * *